United States Patent
Matsushita et al.

(10) Patent No.: US 10,549,188 B2
(45) Date of Patent: Feb. 4, 2020

(54) GAME SYSTEM, GAME CONTROL METHOD, SERVER, AND NON-TRANSITORY STORAGE MEDIUM HAVING STORED THEREIN PROGRAM

(71) Applicant: NINTENDO CO., LTD., Kyoto (JP)

(72) Inventors: Shingo Matsushita, Kyoto (JP); Kouhei Maeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/797,160

(22) Filed: Oct. 30, 2017

(65) Prior Publication Data
US 2018/0207527 A1    Jul. 26, 2018

(30) Foreign Application Priority Data
Jan. 23, 2017  (JP) ................. 2017-009249

(51) Int. Cl.
*A63F 13/00*   (2014.01)
*A63F 13/35*   (2014.01)
(Continued)

(52) U.S. Cl.
CPC .............. *A63F 13/35* (2014.09); *A63F 13/25* (2014.09); *A63F 13/46* (2014.09); *A63F 13/52* (2014.09);
(Continued)

(58) Field of Classification Search
CPC .......... A63F 13/25; A63F 13/35; A63F 13/46; A63F 13/80; A63F 13/92
See application file for complete search history.

(56) References Cited

U.S. PATENT DOCUMENTS 8,696,466 B2 * 4/2014 Buhr ..................... A63F 13/795
    463/29
9,067,095 B2 * 6/2015 Vandevelde ....... A63B 24/0021
(Continued)

FOREIGN PATENT DOCUMENTS

JP    2003-225460    8/2003
JP    2009-189591    8/2009
(Continued)

OTHER PUBLICATIONS

Office Action dated Nov. 20, 2018 issued in Japanese Application No. 2017-009249 (3 pgs.).
(Continued)

*Primary Examiner* — James S. McClellan
*Assistant Examiner* — Kevin M Carter
(74) *Attorney, Agent, or Firm* — Nixon & Vanderhye PC

(57) ABSTRACT

An example of a game system includes a plurality of information processing terminals and a server. A user of each information processing terminal participates in a camp, and a first competition game is performed between camps. A second competition game is performed in each information processing terminal, and points are given based on a result of the second competition game. The points are given in accordance with the number of other users registered as friends by the user. The points based on the second competition game performed in each terminal are tallied in the server, and a winning/losing determination in the first competition game between camps is made based on the tallied points.

26 Claims, 12 Drawing Sheets

(51) Int. Cl.
 *A63F 13/46* (2014.01)
 *H04L 29/06* (2006.01)
 *A63F 13/52* (2014.01)
 *A63F 13/25* (2014.01)
 *A63F 13/80* (2014.01)
 *A63F 13/92* (2014.01)
 *A63F 13/2145* (2014.01)

(52) U.S. Cl.
 CPC .............. *A63F 13/80* (2014.09); *H04L 67/38* (2013.01); *A63F 13/2145* (2014.09); *A63F 13/92* (2014.09)

(56) References Cited

U.S. PATENT DOCUMENTS

| | | | | |
|---|---|---|---|---|
| 9,272,211 | B2* | 3/2016 | Betti | A63F 13/12 |
| 2008/0167129 | A1* | 7/2008 | Aaron | A63F 13/10 |
| | | | | 463/42 |
| 2009/0124320 | A1* | 5/2009 | DeWaal | G07F 17/3258 |
| | | | | 463/16 |
| 2009/0209334 | A1* | 8/2009 | Umaki | A63F 13/00 |
| | | | | 463/29 |
| 2009/0209351 | A1 | 8/2009 | Umaki et al. | |
| 2010/0216553 | A1* | 8/2010 | Chudley | A63F 13/55 |
| | | | | 463/42 |
| 2011/0143840 | A1* | 6/2011 | Sotoike | H04L 67/141 |
| | | | | 463/42 |
| 2012/0142429 | A1* | 6/2012 | Muller | A63F 13/45 |
| | | | | 463/42 |
| 2013/0005480 | A1* | 1/2013 | Bethke | A63F 13/795 |
| | | | | 463/42 |
| 2014/0187325 | A1* | 7/2014 | Masuda | A63F 13/10 |
| | | | | 463/31 |
| 2015/0024852 | A1* | 1/2015 | Pacey | A63F 13/67 |
| | | | | 463/43 |
| 2015/0265918 | A1 | 9/2015 | Yamaguchi et al. | |
| 2016/0107090 | A1* | 4/2016 | Yonekura | G07F 17/32 |
| | | | | 705/39 |

FOREIGN PATENT DOCUMENTS

| | | |
|---|---|---|
| JP | 2013-150645 | 8/2013 |
| JP | 5555819 | 6/2014 |
| JP | 2014-161687 | 9/2014 |
| JP | 2014-183953 | 10/2014 |
| JP | 2014-212958 | 11/2014 |
| JP | 2016-154862 | 9/2016 |

OTHER PUBLICATIONS

Office Action dated Aug. 27, 2018 issued in JP 2017-009249 (5 pgs.).

* cited by examiner

FIG. 5

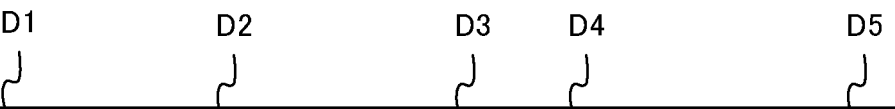

| USER IDENTIFICATION INFORMATION | CHARACTER INFORMATION | FRIEND INFORMATION | CAMP INFORMATION | POINT INFORMATION |
|---|---|---|---|---|
| USER A | CHARACTER A1 | USER B<br>USER C | X | 0 |
| USER B | CHARACTER B1<br>CHARACTER B2 | USER A<br>USER D<br>USER E<br>USER F | X | 800 |
| USER C | CHARACTER C1<br>CHARACTER C2<br>CHARACTER C3 | USER A | Y | 300 |
| USER D | CHARACTER D1 | USER B | Y | 600 |
| USER E | CHARACTER E1 | USER B | – | – |
| USER F | CHARACTER F1<br>CHARACTER F2 | USER B | X | 200 |
| USER G | CHARACTER G1<br>CHARACTER G2<br>CHARACTER G3 | – | X | 100 |

FIG. 7
| FRIEND OF USER A | CAMP | ABILITY VALUE |
|---|---|---|
| USER B | X | 100 |
| USER C | Y | 150 |
| USER H | Y | 300 |
| USER I | X | 80 |
| USER J | X | 50 |
| USER K | X | 85 |
FIG. 8
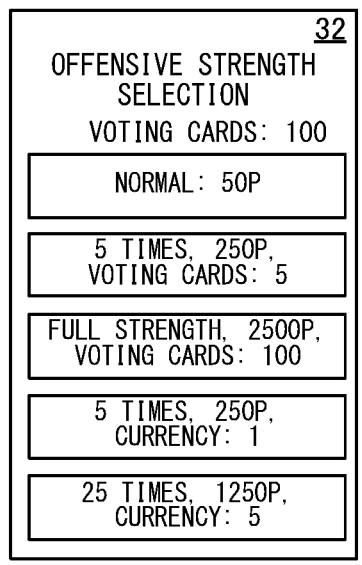
(f-1) OFFENSIVE STRENGTH SELECTION SCREEN (NUMBER OF FRIENDS: 0)
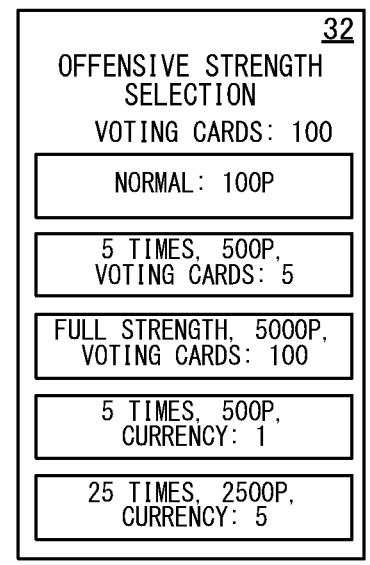
(f-2) OFFENSIVE STRENGTH SELECTION SCREEN (NUMBER OF FRIENDS: 10)

FIG. 9

CURRENT RANKING SCREEN

<u>32</u>

| 1. | XXX: | 1200P |
|---|---|---|
| 2. | XXX: | 1100P |
| 3. | XXX: | 900P |
| 4. | XXX: | 600P |
| 5. | USER A: | 300P |

CAMP SELECTION SCREEN
AFTER OWN ARMY LOSES
(SCREEN FOR USER A)

PLEASE SELECT CHARACTER
WITH WHICH YOU WILL
SIDE

GO-INTO-BATTLE SCREEN
AFTER OWN ARMY WINS
(SCREEN FOR USER C)

GAME SYSTEM, GAME CONTROL METHOD, SERVER, AND NON-TRANSITORY STORAGE MEDIUM HAVING STORED THEREIN PROGRAM

CROSS REFERENCE TO RELATED APPLICATION

The disclosure of Japanese Patent Application No. 2017-009249, filed on Jan. 23, 2017, is incorporated herein by reference.

FIELD

An exemplary embodiment relates to a game system, a game control method, a server, and a program.

BACKGROUND AND SUMMARY

Conventionally, there is a game system where a competition game is performed between terminals via a network. For example, the conventional game system includes a plurality of client apparatuses and a server, and the server provides a competition game for the plurality of client apparatuses.

However, there is room for improvement in enlivening a game between users in a competition game performed via a network.

Therefore, it is an object of an exemplary embodiment to provide a game system for performing a competition game where a game can be enlivened between users.

To achieve the above object, the exemplary embodiment employs the following configurations.

A game system according to an example of the exemplary embodiment is a game system for performing a first competition game among a plurality of users by using a plurality of information processing apparatuses corresponding to the plurality of users and a server. Each of the plurality of information processing apparatuses executes a predetermined game. The game system executes a storing process and a point giving process. In the storing process, the game system stores, in a storage section, identification information corresponding to one of the plurality of users in association with at least one of pieces of identification information corresponding to another one of the plurality of users different from the one of the plurality of users. In the point giving process, based on a result of the predetermined game executed by the information processing apparatus, the game system gives points according to the number of the pieces of identification information corresponding to other users among the plurality of users stored in association with identification information corresponding to the user of the information processing apparatus. The server executes an acquisition process and a winning/losing determination process. In the acquisition process, the server acquires points given based on the result of the predetermined game executed in each of the plurality of information processing apparatuses. In the winning/losing determination process, at a predetermined timing, the server makes a winning/losing determination in the first competition game based on the points acquired in the acquisition process.

Based on the above, a predetermined game can be performed in a plurality of information processing apparatuses, and based on the result of each predetermined game, a competition game can be performed among a plurality of users. Points are given based on the result of the predetermined game performed in each information processing apparatus. These points are given based on the number of pieces of identification information corresponding to other users (e.g., the number of friends) stored in association with identification information corresponding to a user of the information processing apparatus. Thus, it is possible to provide a user with a motivation to register identification information of another user.

Further, the information processing apparatus may repeatedly execute the predetermined game. In the point giving process, the game system may give the points based on the result of the predetermined game every time the predetermined game is executed by the information processing apparatus.

Based on the above, the information processing apparatus repeatedly performs the predetermined game, whereby it is possible to repeatedly give points. Based on the repeatedly given points, a winning/losing determination in a first competition game is made. Thus, it is possible to cause each user to repeatedly execute the predetermined game in an information processing apparatus of the user.

Further, in the point giving process, the larger the number of the pieces of identification information corresponding the other users, the more points the game system gives.

Based on the above, the larger the number of pieces of stored identification information corresponding to other users, the more points are given. Thus, it is possible to provide a user with a motivation to register more identification information corresponding to other users.

Further, the information processing apparatus may perform as the predetermined game a second competition game based on an operation performed in the information processing apparatus. In the point giving process, the game system may give the points based on a winning/losing result in the second competition game. In the winning/losing determination process, the server may make the winning/losing determination in the first competition game based on the points.

Based on the above, each information processing apparatus performs a second competition game, and points are given based on the result of the second competition game. Then, based on the points given in accordance with the result of the second competition game, a winning/losing determination in a first competition game is made. Consequently, each user can enjoy the second competition game in an information processing apparatus of the user themselves and also participate in the first competition game. Thus, it is possible to enhance the interest of a game.

Further, the game system may execute a group registration process for registering each of the plurality of users in any of a plurality of groups. The server may execute a first tallying process for, with respect to each group, tallying points acquired in the acquisition process. In the winning/losing determination process, based on the points tallied with respect to each group in the first tallying process, the server may make a winning/losing determination between the groups as the winning/losing determination in the first competition game.

Based on the above, each user can belong to a group, and a competition game between groups can be performed. Then, the user can cooperate with another user to perform a game.

Further, the server may execute a second tallying process for, with respect to each user, tallying points given based on the result of the predetermined game.

Based on the above, points can be tallied with respect to each user performing the predetermined game. For example, it is possible to present the tallying result to each user. For example, the current ranking of each user is presented to the user, whereby it is possible to give each user a motivation to perform a game.

Further, the server may execute a user evaluation process for evaluating each user based on a result of tallying the points with respect to each user in the second tallying process.

Based on the above, for example, as the evaluation of each user, it is possible to present the current ranking of the user. Thus, it is possible to give each user a motivation to perform a game.

Further, in the predetermined game, the information processing apparatus may make an identification information storing request to store the identification information corresponding to another user in association with the identification information corresponding to the user of the information processing apparatus. In the storing process, based on the identification information storing request, the game system may store the identification information corresponding to another user in association with the identification information.

Based on the above, in the predetermined game, points can be given in accordance with the number of pieces of identification information corresponding to other users, and a request to store identification information corresponding to another user in the predetermined game can be made. Thus, it is possible to cause a user to positively execute the predetermined game to increase the number of pieces of identification information corresponding to other users.

Further, the information processing apparatus may perform the predetermined game using a character of the user of another one of the information processing apparatuses and make the identification information storing request to store the identification information corresponding to the user of the character used in the predetermined game in association with the identification information.

Based on the above, a character of another user can be used in the predetermined game, and identification information corresponding to the user of the character can be stored. For example, when a game is performed using a character of another user in the predetermined game, it is possible to make a friend application for another user. Thus, it is possible to increase friends through the predetermined game.

Further, the information processing apparatus may make the identification information storing request to store the identification information corresponding to another user in association with the identification information when the identification information corresponding to another user is not stored in association with the identification information in the storage section.

Based on the above, it is possible to perform the predetermined game using a character of another user of which identification information is not stored (e.g., another user not registered as a friend). Thus, it is possible to store identification information of another user through the predetermined game.

Further, the game system may execute: a group registration process for registering each of the plurality of users in any of a plurality of groups; and a selection process for selecting a predetermined number of characters of other users from the same group as a group in which the user is registered. In the selection process, the game system may select a first character of a first user corresponding to first identification information stored in association with the identification information in the storage section and a second character of a second user corresponding to second identification information not stored in association with the identification information in the storage section. The information processing apparatus may perform the predetermined game using at least the first character and the second character selected in the selection process.

Based on the above, it is possible to register a plurality of users in a group and perform a competition game between groups. The predetermined game is performed using a first character of another user of which identification information is stored and a second character of another user of which identification information is not stored among other users registered in the same group. Thus, a user can obtain the enjoyment of performing the predetermined game with another user of which identification information is stored. Further, in the predetermined game, a character of another user of which identification information is not stored is also used. Thus, it is possible to give the user an expectation that the user can store new identification information corresponding to another user by performing the predetermined game.

Further, the game system: in the storing process, may store the plurality of pieces of identification information corresponding to other users in association with the identification information; and in the selection process, may select as the first character a character of another one of the plurality of users that is advantageous in the predetermined game from among characters of other users corresponding to the plurality of pieces of identification information corresponding to other users.

Based on the above, the storage of more identification information corresponding to other users is advantageous in the predetermined game. Thus, it is possible to provide a user with a motivation to store a large number of pieces of identification information corresponding to other users.

Further, in the winning/losing determination process, the server may make the winning/losing determination in the first competition game at a timing when a predetermined time elapses, or at a timing when the predetermined game is performed a predetermined number of times.

Based on the above, it is possible to cause a user to perform the predetermined game for a certain period, and cause a large number of users to participate in a first competition game.

Further, in the point giving process, the game system may be able to give the points using a predetermined item, and may give more of the points in a case where the predetermined item is used than in a case where the predetermined item is not used.

Based on the above, a user can increase points using a predetermined item.

Further, the game system may further execute an item setting process for allowing the user to set the number of predetermined items to be used. In the point giving process, the game system may give the points in accordance with the number of predetermined items to be used set by the user.

Based on the above, it is possible to cause the user to select the number of items to be used, and cause the user to select the balance between the number of items to be used and points obtained in accordance with the number of items to be used. This increases the level of strategy in a game, and it is possible to enhance the interest of the game.

Further, in the point giving process, the larger the number of predetermined items to be used, the more of the points the game system gives.

Based on the above, the more items the user uses, the more points the user can obtain.

Further, the predetermined item may be an item acquired by the user charging.

Based on the above, the user can acquire a predetermined item by charging.

Further, the information processing apparatus may vary a representation form in the predetermined game in accordance with the number of the pieces of identification information corresponding to the other users.

Based on the above, it is possible to provide a representation form in the predetermined game in accordance with the number of pieces of identification information corresponding to other users and provide a user with a motivation to increase the number of pieces of identification information corresponding to other users.

Further, the information processing apparatus may perform representation in the predetermined game using a character of a user corresponding to the identification information corresponding to the other users.

Based on the above, representation is performed in the predetermined game using a character of a user corresponding to identification information corresponding to another user. Thus, it is possible to provide a user with a motivation to register identification information corresponding to another user.

Further, in the identification information storing process, the game system may store the identification information corresponding to another user in association with the identification information in accordance with an operation of at least either one of the user corresponding to the identification information and another user corresponding to the identification information corresponding to another user.

Based on the above, it is possible to store identification information corresponding to another user in accordance with operations of both users or an operation of one user.

Further, in the storing process, the game system may store the identification information corresponding to another user in association with the identification information in accordance with operations of the user corresponding to the identification information and another user corresponding to the identification information corresponding to another user.

Based on the above, it is possible to store identification information corresponding to another user in accordance with operations of both users. For example, both users can establish a friend relationship with each other by recognizing each other.

Further, another example of the exemplary embodiment may be a game control method performed by a game system. Further, yet another example of the exemplary embodiment may be a server for executing each process of the game system, or a program executed by the server. For example, the server may execute the storing process, the acquisition process, and the winning/losing determination process.

According to the exemplary embodiment, it is possible to give points in accordance with the number of pieces of identification information corresponding to other users and enhance the interest of a competition game.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 is a diagram showing a non-limiting example of user information stored in a storage device of the server 2;

FIG. 7 is a diagram showing non-limiting examples of friends in a case where a user A has friend relationships with a plurality of users;

FIG. 8 is a diagram showing a non-limiting example of the state where normal offensive strength varies depending on the number of friends of a user;

FIG. 9 is a diagram showing a non-limiting example of a screen for the current ranking of the user A;

DETAILED DESCRIPTION OF NON-LIMITING EXAMPLE EMBODIMENTS (Overall Configuration of System)

Figure 1:
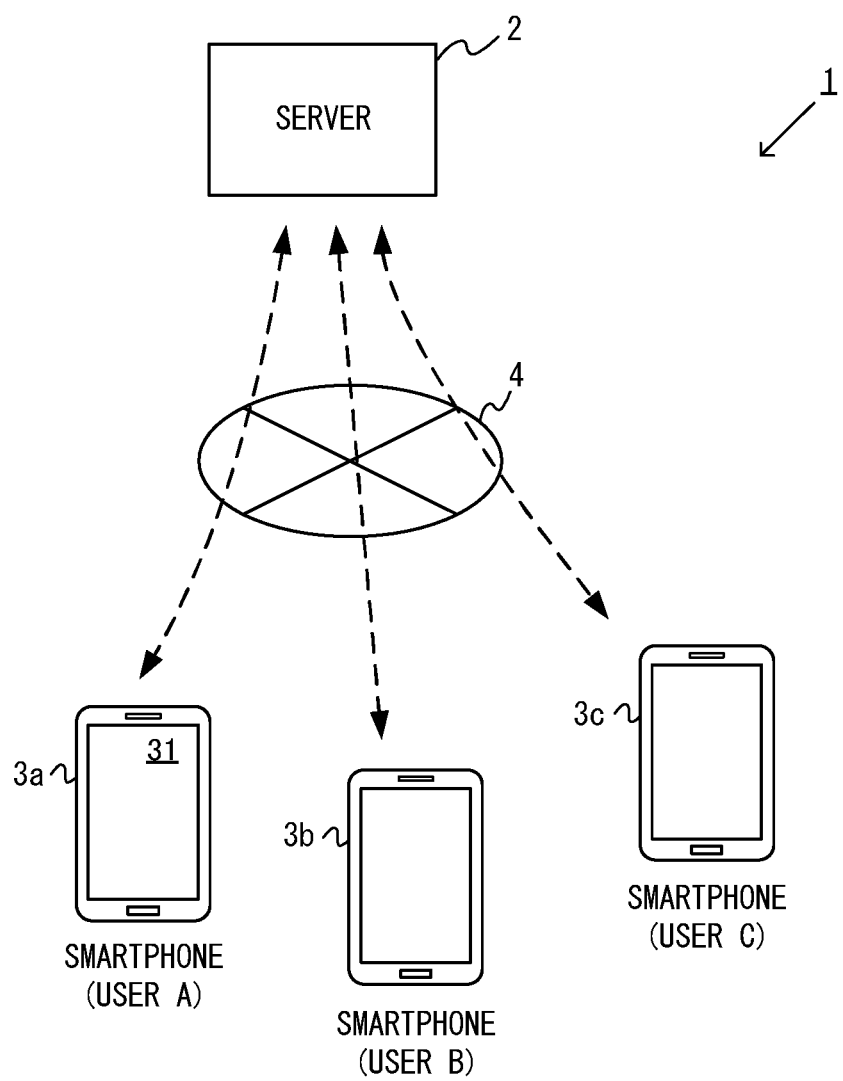
FIG. 1 is a diagram showing a non-limiting example of the configuration of a game system 1 according to an exemplary embodiment.

With reference to the drawings, a description is given below of a game system according to an exemplary embodiment. FIG. 1 is a diagram showing an example of the configuration of a game system 1 according to the exemplary embodiment. As shown in FIG. 1, the game system 1 includes a server 2 and a smartphone 3 as an example of an information processing terminal. The game system 1 includes a plurality of smartphones 3 (3a to 3c in FIG. 1). The game system 1 executes a network-type competition game using the plurality of smartphones 3 and the server 2. The details of the competition game will be described later.

The server 2 is connected to the Internet 4 in a wired (or wireless) manner. The server 2 includes at least one information processing section (CPU), a memory, and a storage device. The server 2 executes a predetermined information processing program for performing the network-type competition game described later. It should be noted that the server 2 may include a plurality of server apparatuses, or may include a single server apparatus.

Each smartphone 3 can connect to a mobile communication network (in other words, a mobile phone network) and function as a mobile phone. The smartphone 3 is connected to the Internet 4 via the mobile communication network. It should be noted that the smartphone 3 has the function of connecting to a wireless LAN, and may be able to connect to the Internet 4 via at least one of the wireless LAN and the mobile communication network.

Further, in the exemplary embodiment, a smartphone is used as an example of the information processing terminal. In another exemplary embodiment, for example, a mobile phone, a tablet terminal, a personal computer, a game apparatus, or the like may be used as the information processing terminal. The information processing terminal may be a mobile information processing apparatus, or may be a stationary information processing apparatus.

As shown in FIG. 1, for example, the smartphone 3a is used by a user A, the smartphone 3b is used by a user B, and the smartphone 3c is used by a user C. In addition to the smartphones 3a to 3c, a large number of smartphones 3 are connected to the server 2 via the Internet 4.

In each smartphone 3, a predetermined game application is installed. Each user executes the game application using the smartphone 3 of the user themselves, thereby performing a predetermined game.

Figure 2:
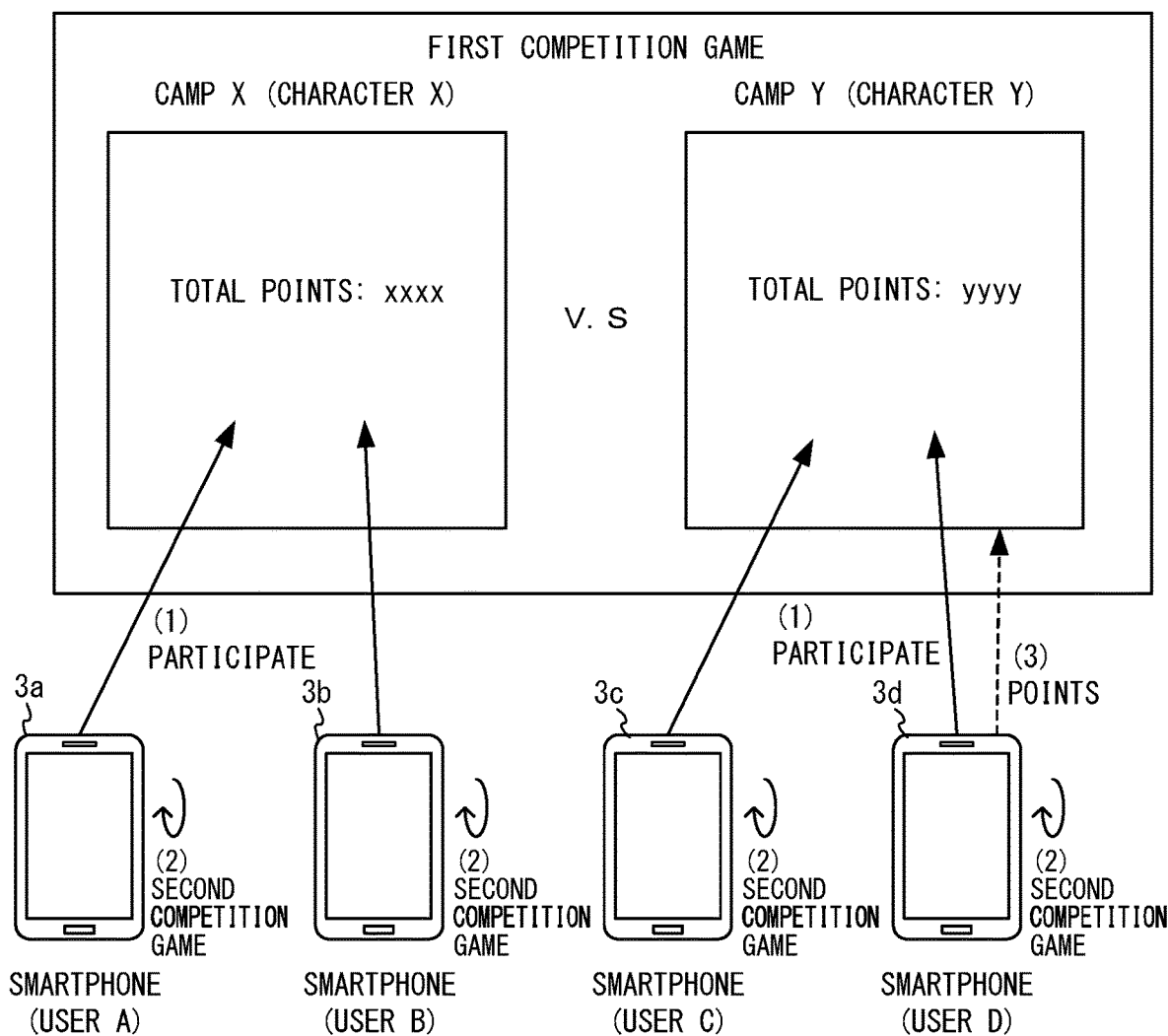
FIG. 2 is a diagram conceptually showing a non-limiting example of a network-type competition game according to the exemplary embodiment.

FIG. 2 is a diagram conceptually showing an example of the network-type competition game according to the exemplary embodiment. In the exemplary embodiment, a competition game event is held at a predetermined date, and a plurality of users can participate in this event. It should be noted that in each smartphone 3, a game (e.g., a role-playing game) different from the network-type competition game is performed in a game application, regardless of whether or not the current period is the period of the competition game event. As shown in FIG. 2, in the exemplary embodiment, when the competition game event is held, a competition game (hereinafter, a competition game performed between camps will be referred to as a "first competition game") is performed between a camp X, which includes a certain character (e.g., a character X), and a camp Y, which includes another character (e.g., a character Y).

Specifically, each user participates in either one of the camp X and the camp Y as an ally (1). Each user selects in which of the camps the user is to participate. For example, the user A (the smartphone 3a) and the user B (the smartphone 3b) participate in the camp X, and the user C (the smartphone 3c) and a user D (a smartphone 3d) participate in the camp Y.

The users having participated in the camps perform a second competition game using the smartphones 3 (2). The second competition game is performed in a game application installed in each smartphone 3. That is, the second competition game is a game individually performed in each smartphone 3. The second competition game is a game where a plurality of characters included in the camp X fight against a plurality of characters included in the camp Y, and is a game forming part of the above competition game between camps (the first competition game). For example, characters used in the games may be common between the first competition game between camps and the second competition game performed in each smartphone 3.

The result of the second competition game performed in each smartphone 3 is transmitted to the server 2. Specifically, when a user wins the second competition game, points are calculated in the smartphone 3 of the user in accordance with the result of the second competition game, and the calculated points are transmitted to the server 2 (3). It should be noted that each smartphone 3 may transmit the result of the second competition game to the server 2, and the server 2 may calculate points based on the result of the second competition game.

The points according to the result of the second competition game performed by the user are added to the camp in which the user participates. For example, the user D (the smartphone 3d) participates in the camp Y. If the user D wins the second competition game, points according to the result of the second competition game are added to the total points of the camp Y.

The points according to the results of the second competition game thus performed in the smartphones 3 are aggregated in both camps. The camp having a larger total of points aggregated in a predetermined period wins the first competition game between camps.

Figure 3:
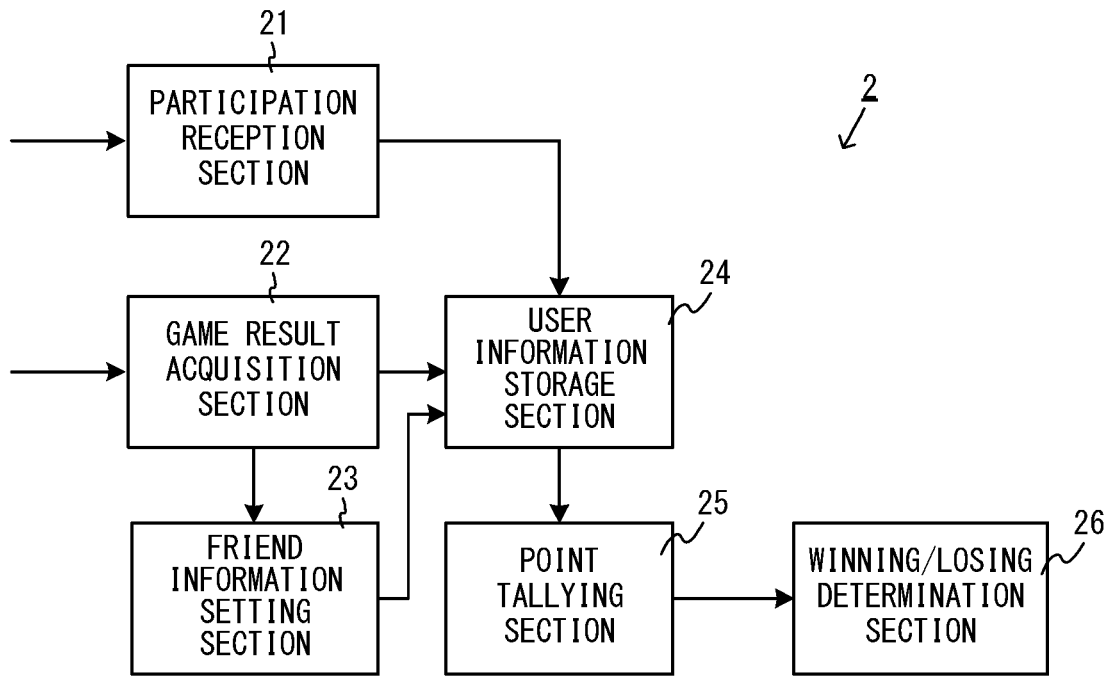
FIG. 3 is a block diagram showing a non-limiting example of the functional configuration of a server 2.

FIG. 3 is a block diagram showing an example of the functional configuration of the server 2. The server 2 includes a participation reception section 21, a game result acquisition section 22, a friend information setting section 23, a user information storage section 24, a point tallying section 25, and a winning/losing determination section 26. The CPU included in the server 2 executes a predetermined server program, thereby achieving the components shown in FIG. 3.

The participation reception section 21 of the server 2 receives participation in the competition game event from each smartphone 3 (corresponding to (1) in FIG. 2). When the participation reception section 21 receives participation from each smartphone 3, information of the participation is stored in the user information storage section 24.

The game result acquisition section 22 acquires the result of the second competition game performed in each smartphone 3. Specifically, when the second competition game is performed in each smartphone 3, the game result acquisition section 22 acquires the result of the second competition game as point information from the smartphone 3 ((3) in FIG. 2). The game result acquisition section 22 stores the point information acquired from each smartphone 3, with respect to each user in the user information storage section 24. Further, as will be described later, the game result acquisition section 22 acquires friend application information transmitted together with the point information from each smartphone 3 and transmits the friend application information to the friend information setting section 23.

The friend information setting section 23 sets a friend relationship between users. For example, when the user A makes a friend application for the user B, the friend information setting section 23 notifies the user B that the user A makes a friend application. When the user B permits the friend application, a friend relationship is established between the user A and the user B. Specifically, the friend information setting section 23 stores identification information corresponding to the user B in association with identification information corresponding to the user A in the user information storage section 24 and also stores the identification information corresponding to the user A in association with the identification information corresponding to the user B in the user information storage section 24.

Here, "identification information corresponding to a user" may be identification information identifying the user (e.g., a user ID, a user name, an electronic mail address, or the like), or may be information uniquely identifying the smartphone 3 (an information processing apparatus) of the user. Here, "identification information corresponding to a user" is identification information identifying the user.

The user information storage section 24 is a storage device for storing various pieces of information regarding the user of each smartphone 3. Specifically, in the user information storage section 24, identification information identifying the user of each smartphone 3 and point information acquired by the game result acquisition section 22, friend information, and camp information are stored. These pieces of information stored in the user information storage section 24 will be described later with reference to FIG. 5.

The point tallying section 25 acquires point information of each user from the user information storage section 24 and tallies points.

The winning/losing determination section 26 determines winning or losing between camps based on the result of the point tallying section 25 tallying points.

Figure 4:
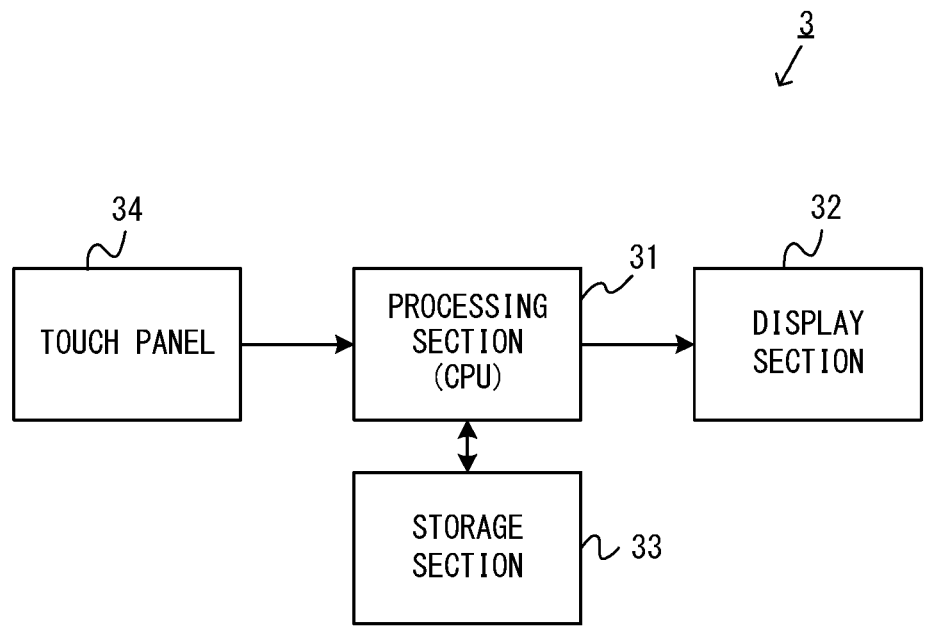
FIG. 4 is a block diagram showing a non-limiting example of the configuration of each smartphone 3.

FIG. 4 is a block diagram showing an example of the configuration of each smartphone 3. The smartphone 3 includes a processing section 31, a display section 32, a storage section 33, and a touch panel 34.

The processing section 31 is an information processing section for cooperating with, for example, a memory (not shown) to execute a game application program and includes a CPU for executing a program and a GPU for performing image processing. The processing section 31 can execute any other application programs in addition to the game application program for performing the above competition game between a plurality of users.

The display section 32 is a display device for displaying a character, an image, and the like on a screen and is, for example, a liquid crystal display device, an organic EL display device, or the like.

The storage section 33 is, for example, a non-volatile memory and stores the above game application program and various pieces of setting information.

The touch panel 34 is provided on the screen of the display section 32 and detects a position on the screen touched by the user.

In addition to these components, the smartphone 3 includes a communication section for connecting to the Internet, a battery, and the like.

FIG. 5 is a diagram showing an example of user information stored in the storage device of the server 2. As shown in FIG. 5, the server 2 stores information of each user as a table. In the table, user identification information D1 for identifying each user, character information D2, friend information D3, camp information D4, and point information D5 are stored in association with each other.

The user identification information D1 is identification information corresponding to a user and is identification information individually assigned to the user.

The character information D2 is information indicating a character owned by a user. For example, the user A has a character A1, and identification information of the user A and information indicating the character A1 are stored in association with each other. Each user can have one or more characters. A character owned by the user may be any of a plurality of characters determined in advance. Further, a character owned by the user may be a character uniquely created by the user. In a game according to the exemplary embodiment, a plurality of characters are prepared in advance, and a character of each user is at least any one of the plurality of characters prepared in advance.

The friend information D3 is information for identifying users having a friend relationship with each other. Here, a friend relationship is established, for example, when one user makes a friend application for the other user, and the other user permits the friend application. When the friend relationship is established, identification information of the other user is stored in association with identification information of the one user, and the identification information of the one user in association with the identification information of the other user is stored. In the exemplary embodiment, it is possible to store identification information of a plurality of users in association with identification information of a single user.

Specifically, as shown in FIG. 5, each user can establish friend relationships with a plurality of users. For example, the user A can establish a friend relationship with the user B and also establish a friend relationship with the user C. In this case, identification information of the user B is stored in the friend information D3 corresponding to the user A, and identification information of the user A is stored in the friend information D3 corresponding to the user B. Further, identification information of the user C is stored in the friend information D3 corresponding to the user A, and the identification information of the user A is stored in the friend information D3 corresponding to the user C. Further, when a user does not have a friend relationship with any of the other users, information is not stored in the friend information D3 of the user. For example, the user G does not have a friend relationship with any of the other users. Thus, identification information of another user is not stored in the friend information D3.

It should be noted that a friend relationship may be established not only by a method in which one user makes a friend application, but also by another method. For example, the user A may input the identification information of the user B to the smartphone 3a and register the identification information of the user B, and also the user B may input the identification information of the user A to the smartphone 3b and register the identification information of the user A, whereby a friend relationship may be established between the user A and the user B.

The camp information D4 is information indicating in which of the camps a user participates as an ally (to which of the camps the user belongs). As shown in FIG. 5, for example, when the user A participates in the camp X, information indicating the camp X is stored in the camp information D4 of the user A. When the user C participates in the camp Y, information indicating the camp Y is stored in the camp information D4 of the user C.

It should be noted that in the server 2, all the users who have installed this game application are registered. In each smartphone 3 in which this game application is installed, it is possible to participate in any of the camps at any timing while the competition game event is held. As shown in FIG. 5, the user E does not participate in any of the camps. Thus, information is not stored in the camp information D4 corresponding to the user E.

The point information D5 is information indicating points gained by a user executing the second competition game. When a user executes the second competition game and wins the second competition game, points are given to the user. The user can execute the second competition game multiple times, and the total of points gained every time the second competition game is performed is stored as the point information D5 in the server 2.

It should be noted that also in each smartphone 3, the user identification information D1, the character information D2, the friend information D3, and the point information D5 of the user of the smartphone 3 itself may be stored. Further, data regarding a character corresponding to each piece of friend information (a character name, image data, and the like) may be stored in the smartphone 3.

A competition between a certain camp and another camp is performed for a predetermined period (e.g., for one to several days). For example, a competition between a certain camp and another camp may be performed for two days. In this predetermined period, a user can perform the second competition game multiple times. However, when a certain user executes the second competition game, the execution of the second competition game is restricted until a predetermined time (e.g., an hour) elapses. Further, even when the predetermined time or more elapses, the user can have only one right to execute the second competition game. That is, each user executes the second competition game only once by exercising a right to execute the second competition game. Then, for example, when an hour elapses, the right to execute the second competition game is restored. However, even when an hour or more elapses, the user can have only one right to execute the second competition game. Thus, for example, even when two hours elapse from the execution of the previous second competition game, the right to execute the second competition game does not increase to two rights. It should be noted that each user may have a plurality of rights to execute the second competition game. For example, rights to execute the second competition game may increase one by one every time the predetermined time elapses.

For example, in the table shown in FIG. 5, the execution time of the previous second competition game (specifically, the time of the end of the second competition game) may be stored. Further, in each smartphone 3, the execution time of the previous second competition game may be stored. The server 2 or the smartphone 3 determines whether or not the predetermined time (e.g., an hour) elapses from the stored execution time of the previous second competition game. When the predetermined time elapses, the second competition game can be executed in the smartphone 3. It should be noted that only when a user wins the second competition game, the execution of the second competition game may be restricted. That is, when the user loses the second competition game, the user may be able to execute the second competition game without waiting for the predetermined time. When the user wins the second competition game, the user may be able to execute the second competition game after the lapse of the predetermined time.

Figure 6:
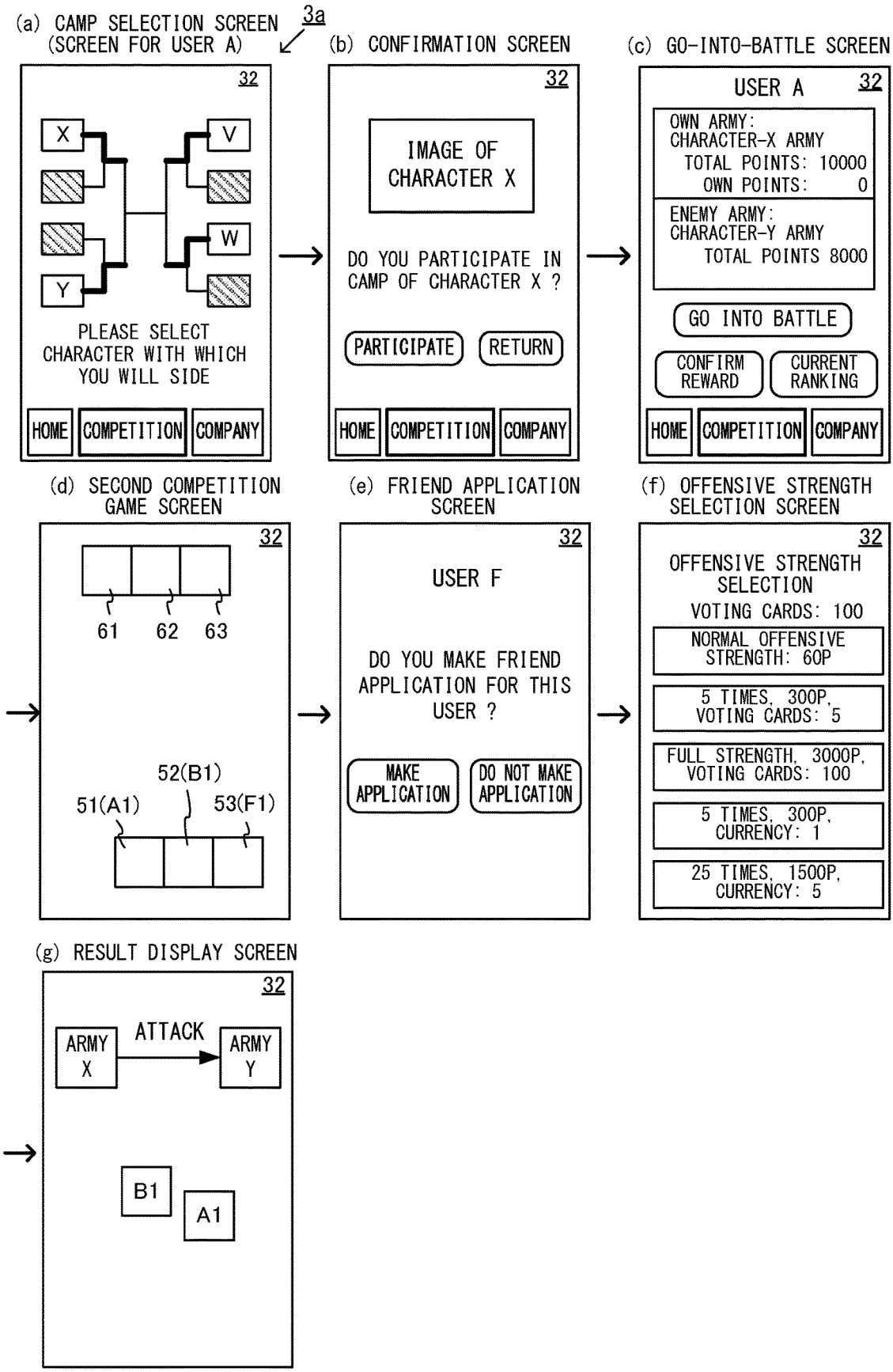
FIG. 6 is a diagram showing a non-limiting example of the screen transition of the smartphone 3 in a case where a game application according to the exemplary embodiment is executed.

Next, a description is given of, when a game application according to the exemplary embodiment is executed in each smartphone 3, an image displayed on the screen of the display section 32 of the smartphone 3. FIG. 6 is a diagram showing an example of the screen transition of the smartphone 3 in a case where the game application according to the exemplary embodiment is executed.

FIG. 6 shows a screen for the user A (the smartphone 3a). When the game application according to the exemplary embodiment is executed, a camp selection screen shown in (a) of FIG. 6 is displayed. Specifically, for example, in a lower area of the screen of the display section 32, menu icons ("home", "competition", and "company" icons and the like) are displayed. When the "competition" icon is selected by the user, then as shown in (a) of FIG. 6, a tournament chart is displayed. The above first competition game is performed in a tournament form. For example, eight camps compete against each other in a tournament form. The screen shown in (a) of FIG. 6 is a screen on which first-round matches of the tournament end, and second-round matches are to be performed (are being performed). Specifically, the camp X, the camp Y, a camp V, and a camp W survive the first-round matches. In one of the second-round matches, a competition between the camp X and the camp Y is performed. Further, in another one of the second-round matches, a competition between the camp V and the camp W is performed. On the camp selection screen in (a) of FIG. 6, the user A can select any of the camp X, the camp Y, the camp V, and the camp W.

For example, when the user A taps and selects the camp X, a confirmation screen shown in (b) of FIG. 6 is displayed. On this screen, an image of the character X, which is the leader of the camp X, is displayed, and the user A is allowed to select whether or not to participate in the camp X as an ally. When a "participate" button is tapped here, a go-into-battle screen shown in (c) of FIG. 6 is displayed.

On the go-into-battle screen in (c) of FIG. 6, current information regarding an own army X (the camp X) of the user A and current information regarding an enemy army Y (the camp Y) are displayed. Specifically, the grand total of points gained by the own army X at the current moment (total points "10000" of the own army shown in (c) of FIG. 6) and points gained by the user A themselves performing the second competition game in the current competition between the camp X and the camp Y (the second-round match in the tournament) (own points "0") are displayed. It should be noted that the own points and the total points are calculated for each competition. When a competition between a certain camp and another camp ends, the own points and the total points are reset to "0". (c) of FIG. 6 shows a go-into-battle screen displayed for the first time since the user A has participated in the camp X. Thus, "0" is displayed as the own points. Further, on the go-into-battle screen in (c) of FIG. 6, the grand total of the current points of the enemy army (total points "8000" of the enemy army shown in (c) of FIG. 6) is displayed. It should be noted that each user cannot view the current total points of each camp until the user participates in a certain camp.

On the go-into-battle screen in (c) of FIG. 6, three buttons, namely a "go into battle" button, a "confirm reward" button, and a "current ranking" button, are displayed. When the "go into battle" button is selected by the user A, the screen transitions to a second competition game screen in (d) of FIG. 6, and the second competition game is performed.

As shown in (d) of FIG. 6, in an upper area of the second competition game screen, enemy characters 61, 62, and 63 of the enemy army Y are displayed, and in a lower area of the second competition game screen, own characters 51, 52, and 53 of the own army X are displayed. The second competition game is a game where the three enemy characters 61 to 63 compete against the three own characters 51 to 53.

The own character 51 is a character owned by the user A. When the user A has a plurality of characters, any one of these characters is selected as the own character 51. For example, a single main character may be selected from among the plurality of characters owned by the user A. Alternatively, the user may select one of the plurality of characters. Yet alternatively, one of the plurality of characters may be randomly selected. Yet alternatively, based on a parameter (an ability value or the like) of each character owned by the user A, any one of the plurality of characters may be selected. Here, the own character 51 is the character A1 owned by the user A.

The own character 52 is a character of another user who has a friend relationship with the user A and participates in the same camp X as the user A. When there are a plurality of users who have friend relationships with the user A and participate in the same camp X as the user A, a character of any one of the plurality of users is selected.

FIG. 7 is a diagram showing examples of friends in a case where the user A has friend relationships with a plurality of users. In FIG. 7, the user A has friend relationships with, for example, the user B, the user C, a user H, a user I, a user J, and a user K. That is, identification information of the users B, C, and H to K is stored in the friend information D3 corresponding to the user A. In the examples shown in FIG. 7, the user C and the user H belong to the camp Y, and the users B and I to K belong to the camp X. In this case, a character of any one of the users B and I to K, who belong to the same camp X as the user A, is selected as the own character 52. Specifically, any one of the top three users having high predetermined ability values (game parameters that increase in accordance with the execution of the game application) among the users B and I to K may be randomly selected, and a character of the selected user may be selected as the own character 52. That is, as the own character 52, a character having a high ability value among characters of the other users having friend relationships with user A is selected. Thus, a more advantageous character for the user A in the execution of the second competition game is selected as the own character 52.

For example, in the case shown in FIG. 7, the user B, the user I, the user J, and the user K have friend relationships with the user A and participate in the camp X. In this case, any one of the top three users having high ability values (the user B, the user K, and the user I) is selected, and a character of this user is selected as the own character 52. Here, the user B is selected from among the top three users having high ability values. Thus, as shown in (d) of FIG. 6, a character B1, which is owned by the user B, is displayed as the own character 52. It should be noted that the configuration may be such that a user having the highest ability value is always selected, or the configuration may be such that the higher the ability value of a user, the more likely the user is selected.

Further, the own character 53 is a character of another user who participates in the same camp X as the user A and does not have a friend relationship with the user A. As the own character 53, a character having an ability value in a range corresponding to the ability value of the own character 51 is selected.

For example, as shown in FIG. 5, when the user F does not have a friend relationship with the user A and participates in the camp X, a character F1 of the user F is selected as the own character 53. In this case, as shown in (d) of FIG. 6, an image illustrating the character F1 is displayed on the screen of the display section 32 of the smartphone 3.

It should be noted that when there is not a user who has a friend relationship with the user A and participates in the same camp as the user A, characters of other users who participate in the same camp X as the user A and do not have friend relationships with the user A are randomly selected as the own characters 52 and 53.

On the other hand, as the enemy characters 61 to 63, characters of users who participate in the enemy camp Y are selected. The enemy characters 61 to 63 are selected in accordance with the ability values of the own characters 51 to 53. For example, a character having an ability value in a range corresponding to the ability value of the own character 51 is selected as the enemy character 61. Further, a character having an ability value in a range corresponding to the ability value of the own character 52 is selected as the enemy character 62. Further, a character having an ability value in a range corresponding to the ability value of the own character 53 is selected as the enemy character 63. It should be noted that when the ability values of the own characters 52 and 53 exceed the ability value of the own character 51, the enemy characters 62 and 63 are selected using the ability value of the own character 51 as a reference.

The plurality of characters (52 to 53 and 61 to 63) may be selected in the server 2, or may be selected in the smartphone 3. Alternatively, some of the plurality of characters may be selected in the server 2, and the other characters may be selected in the smartphone 3. For example, when an instruction to start the second competition game is given in the smartphone 3a (when the "go into battle" button is selected on the go-into-battle screen in (c) of FIG. 6), the smartphone 3a transmits to the server 2 a notification that an instruction to start the second competition game is given, and in accordance with the notification, the server 2 may select the own characters 52 and 53 and the enemy characters 61 to 63. Further, when the friend information of the user A, information indicating to which of the camps each friend (each user having a friend relationship with the user A) belongs, and the ability value of each friend are stored in the smartphone 3, the smartphone 3 may select the own character 52 based on these pieces of information.

The second competition game is performed using the thus selected own characters 51 to 53 and enemy characters 61 to 63. In the second competition game, a game is performed where the own characters 51 to 53 fight against the enemy characters 61 to 63. The own characters 51 to 53 are operated by the user A, and the enemy characters 61 to 63 are operated by the smartphone 3a. That is, the enemy characters 61 to 63 are CPU characters controlled by the CPU of the smartphone 3a executing the game application program. In the second competition game, the user A operates the own characters 51 to 53 to fight against the enemy characters 61 to 63.

As a result of the second competition game shown in (d) of FIG. 6, when the user A (the own characters 51 to 53) wins, a friend application screen shown in (e) of FIG. 6 is displayed. On the friend application screen in (e) of FIG. 6, the user A is allowed to select whether or not to make a friend application for the user F, who does not have a friend relationship with the user A and belongs to the same camp X as the user A. That is, on the friend application screen, the user is allowed to select whether or not to make an application for newly establishing a friend relationship with the user F, with whom the user has not yet established a friend relationship, among users (the user F and the user B) corresponding to characters (F1 and B1) with which the user has fought in the second competition game. Here, when the user A selects a "make application" button, a friend application for the user F is made. When the user A selects a "do not make application" button, a friend application is not made. When a friend application for the user F is made, and for example, when the user F executes the game application in the smartphone 3 of the user F next time, it is indicated that a friend application is made by the user A. Then, when the user F permits this friend application, a friend relationship is established between the user A and the user F. When the user A selects the "make application" button or the "do not make application" button on the friend application screen, an offensive strength selection screen shown in (f) of FIG. 6 is displayed.

It should be noted that when there are two users corresponding to characters with which the user has fought in the second competition game, a friend application screen for a first user is displayed. When a "make application" button or a "do not make application" button is selected for the first user, then subsequently, a friend application screen for a second user is displayed. Then, when a "make application" button or a "do not make application" button is selected for the second user, the offensive strength selection screen shown in (f) of FIG. 6 is displayed.

On the offensive strength selection screen shown in (f) of FIG. 6, a selection is made regarding whether or not to increase the offensive strength of the attack of the camp X on the camp Y. Specifically, a selection is made regarding whether or not to make an attack with an offensive strength stronger than a normal offensive strength ("60" in (f) of FIG. 6) in exchange for an item owned by the user A or virtual currency used in the game. For example, each user has a predetermined number of voting cards, and can increase the offensive strength to five times or a hundred times the normal offensive strength by using (consuming) the voting cards. Further, each user has in-game virtual currency, and can increase the offensive strength to five times or a hundred times the normal offensive strength by using (consuming) the virtual currency. A predetermined number of "voting cards" are given every day, for example, when this competition game event is held. Further, each user can obtain virtual currency by executing a game performed by executing this game application (a game different from the first and second competition games related to the competition game event and performed in each smartphone 3), or can obtain virtual currency by charging (i.e., purchase in-game virtual currency with real currency).

Here, the "normal offensive strength" varies depending on the number of friends of the user, i.e., the number of other users with whom the user has friend relationships. The larger the number of friends, the greater the "normal offensive strength". Specifically, the normal offensive strength is obtained by the formula "normal offensive strength=number of friends×5+50". For example, as shown in FIG. 5, the number of friends of the user A is "2". Thus, on the screen shown in (f) of FIG. 6, "60 (=2×5+50)" is displayed as "normal". That is, the normal offensive strength is determined in accordance with the number of friends of the user A, regardless of whether or not the friends of the user A belong to the same camp X as the user A. For example, as shown in FIG. 5, the user B, who is a friend of the user A, belongs to the same camp X as the user A, whereas the user C, who is a friend of the user A, belongs to the camp Y. Even in this case, the user C is tallied in the number of friends. Further, even a friend who does not belong to any of the camps is tallied in the number of friends. It should be noted that there is a case where a character owned by a user and a character of the leader of a camp in which the user participates is the same. In this case, bonus points are added to the normal offensive strength determined by the above formula, and the normal offensive strength further increases.

It should be noted that the normal offensive strength may be determined based on the number of users belonging to the same camp among other users having friend relationships with the user. That is, it may be set such that the larger the number of friends belonging to the same camp, the greater the normal offensive strength.

FIG. 8 is a diagram showing the state where the normal offensive strength varies depending on the number of friends of the user. As shown in (f-1) of FIG. 8, for example, when the number of friends of the user is "0", "50" is displayed as the normal offensive strength on the offensive strength selection screen. Further, when the number of friends of the user is "10", "100" is displayed as the normal offensive strength on the offensive strength selection screen.

As described above, in the exemplary embodiment, the larger the number of friends of the user, the greater the normal offensive strength. That is, the larger the number of friends, the larger the number of points to be given. In the exemplary embodiment, there is an upper limit on the normal offensive strength. For example, the "normal offensive strength" is set to up to "100". Thus, when the number of friends of the user is between "1 to 10", the larger the number of friends, the greater the normal offensive strength, and the larger the number of points to be given. However, when the number of friends is equal to or greater than "10", the normal offensive strength is "100". It should be noted that an upper limit may not be set on the normal offensive strength. Further, in the exemplary embodiment, the normal offensive strength, i.e., the number of points to be given, increases in proportion to the number of friends. Alternatively, the number of friends and the number of points to be given may not have a proportional relationship. For example, it may be set such that the larger the number of friends, the higher the rate of increase in points to be given. Alternatively, it may be set such that the larger the number of friends, the lower the rate of increase in points.

When the offensive strength is selected on the offensive strength selection screen shown in (f) of FIG. 6, then as shown in (g) of FIG. 6, a result display screen is displayed. On the result display screen, the state where the own army X attacks the enemy army Y is displayed. Further, the character A1 of the user A and the character B1 of the user B, who has a friend relationship with the user A, are displayed on the screen. Here, all characters of users who participate in the same camp and have friend relationships are displayed. That is, not only the character B1, which is used in the current second competition game, but also characters of all the users having friend relationships with the user A are displayed on the result display screen. Thus, when the number of friends participate in the same camp is large, many characters are displayed on this screen. It should be noted that on the result display screen, all characters of other users having friend relationships with the user may be displayed, regardless of which of the camps the other users participate in.

For example, while the result display screen shown in (g) of FIG. 6 is displayed, the smartphone 3a and the server 2 communicate with each other, and points given to the user A in the current second competition game are transmitted to the server 2. Further, when a friend application for the user F is made on the screen in (e) of FIG. 6, information regarding this friend application is transmitted to the server 2.

Here, when the user A selects the button image indicating "current ranking" on the go-into-battle screen in (c) of FIG. 6, the ranking of the user A in the camp X is displayed. Specifically, when the "current ranking" button is selected, the smartphone 3a accesses the server 2 and acquires the ranking of the user A.

FIG. 9 is a diagram showing an example of a screen for the current ranking of the user A. As shown in FIG. 9, among the users belonging to the same camp X as the user A, users from the first ranking to a predetermined ranking regarding the number of points are arranged and displayed with the numbers of points in order from the top. In this manner, each user can confirm at which position the user themselves is currently ranked in the same camp regarding the number of obtained points. Thus, it is possible to provide a user with a motivation to perform a game.

Figure 10:
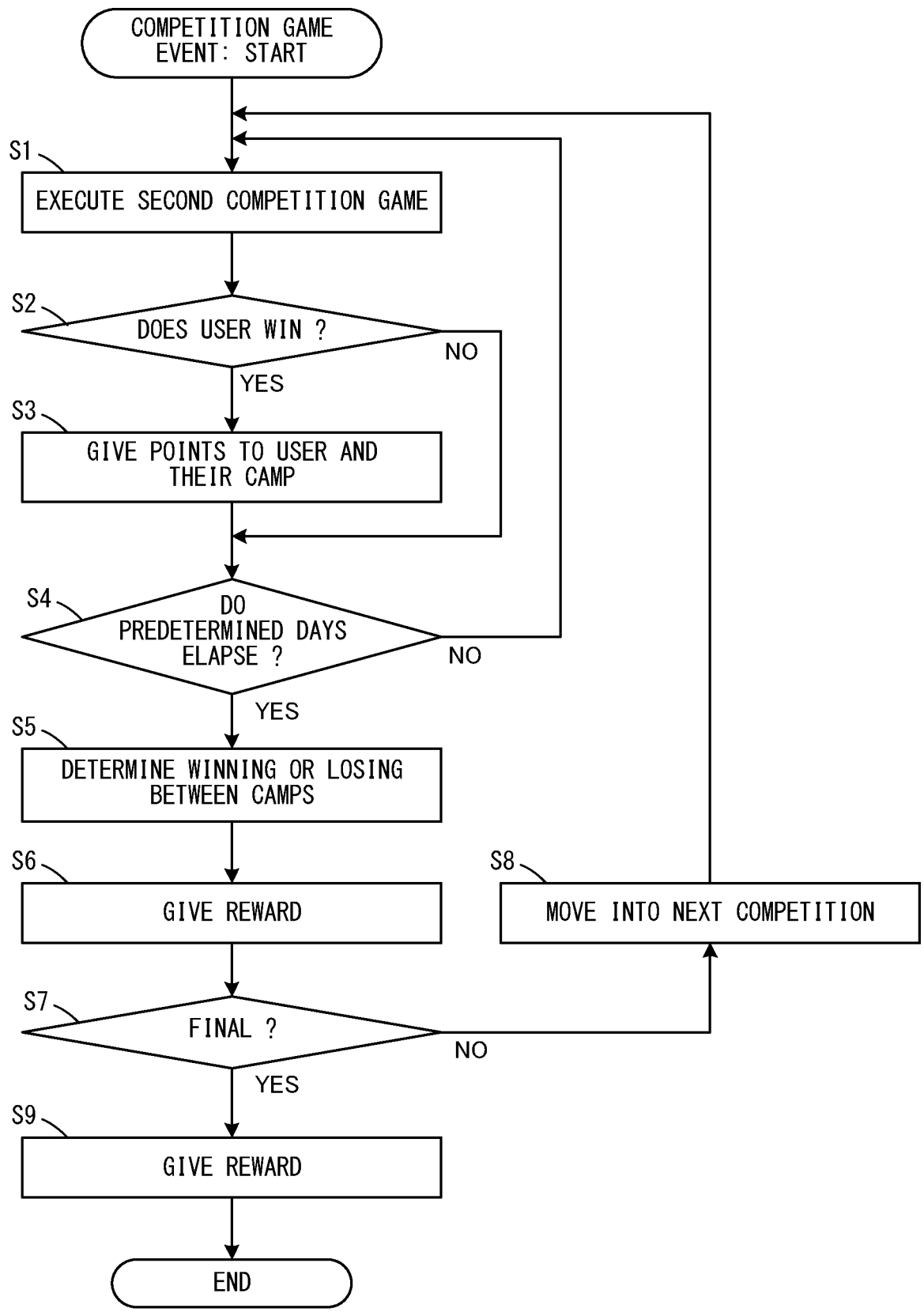
FIG. 10 is a diagram conceptually showing a non-limiting example of the flow of the competition game according to the exemplary embodiment.

FIG. 10 is a diagram conceptually showing an example of the flow of the competition game according to the exemplary embodiment. As shown in FIG. 10, when the competition game event is started, the second competition game shown in FIG. 6 is executed in each smartphone 3 (step S1). As a result of the second competition game, when the user wins (step S2: YES), points are given to the user, and points are given to a camp to which the user belongs (step S3). Specifically, the points of a camp is the total of points gained in the second competition game by all the users belonging to the camp. When the user does not win (step S2: NO), points are not given to the user and the camp. The execution of the second competition game in each smartphone 3 (S1) and the giving of points according to the result of the second competition game (S3) are repeatedly executed for predetermined days (e.g., one to several days).

When the predetermined days elapse (step S4: YES), a winning/losing determination between camps is made (step S5). That is, based on the total of points of a certain camp and the total of points of a camp as the opponent of the certain camp, a winning/losing determination is made. For example, the total of points according to the result of the second competition game performed in a large number of smartphones 3 belonging to the camp X is calculated as the total points of the camp X, and the total of points according to the result of the second competition game performed in a large number of smartphones 3 belonging to the camp Y are also calculated as the total points of the camp Y. Then, for example, when the total points of the camp Y are more than the total points of the camp X, it is determined that the camp Y wins.

Next, a reward is given to the user (step S6). Here, a reward for a camp and a reward for an individual user are given. Specifically, as the reward for a camp, predetermined rewards are given to all the users belonging to the winning camp. Further, as the reward for an individual user, predetermined rewards corresponding to rankings regarding the number of points in each camp are given. The predetermined rewards corresponding to rankings are given not only to users in a winning camp but also to users in a losing camp. For example, when the camp X loses and the camp Y wins, rewards corresponding to rankings are given to, among all the users belonging to the winning camp Y, users at the first ranking to the thousandth ranking regarding the number of points. Similarly, rewards corresponding to rankings are given to, among all the users belonging to the losing camp X, users at the first ranking to the thousandth ranking in descending order of the number of points. The predetermined rewards to be given here may be, for example, an item that can be used in a game, in-game virtual currency, a character, an image, a sound, or the like.

As described above, a user selects either of two camps based on the preference of the user themselves. Thus, for example, there is a tendency that the higher the popularity of a character as the leader of a camp, the more users participate in the camp of the character. As is clear from the above, the more users participate in a camp, the more advantageous in the first competition game. Meanwhile, the larger the number of users participating in the same camp, the more difficult to gain a higher ranking regarding the number of points in the camp. In the exemplary embodiment, predetermined rewards are given also to a losing camp in accordance with rankings regarding points in the losing camp. Thus, for example, the user may purposely participate in the camp of a character having low popularity so that the user can gain a higher ranking in the same camp. As described above, rewards are given also to a losing camp in accordance with rankings in the camp, whereby it is possible to prevent the imbalance between the numbers of users participating in camps to some extent.

It should be noted that in a single competition, the winning/losing determination between camps in step S5 and the giving of a reward in step S6 may be performed multiple times. For example, the winning/losing determination between camps in step S5 and the giving of a reward step S6 may be performed every day, and in accordance with the result of the first competition game performed for several days, an overall winning/losing determination between camps may be made. For example, the winning/losing determination between camps in step S5 may be made every day, and a camp having won more times in the winning/losing determination in step S5 may obtain an overall win in the current first competition game.

When the reward is given to the user, it is determined whether or not this competition is a final (step S7). When this competition is not the final (step S7: NO), the current competition ends, and the user is moved into a next competition (step S8). That is, when the current competition is a first-round match, the user is moved into a second-round match. When the current competition is a second-round match, the user is moved into the final. In the next competition, the first competition game is newly performed between camps having won in the current competitions.

Here, a user having participated in a winning camp participates in the same camp also in the next first competition game, and cannot select another camp. On the other hand, a user having participated in a losing camp can participate in another camp. For example, in a case where the user A participates in the camp X, and the user C participates in the camp Y, and when the camp Y wins, the user A selects a camp in which the user A is to newly participate, and the user C moves into the next first competition game by remaining in the camp Y.

Figure 11:
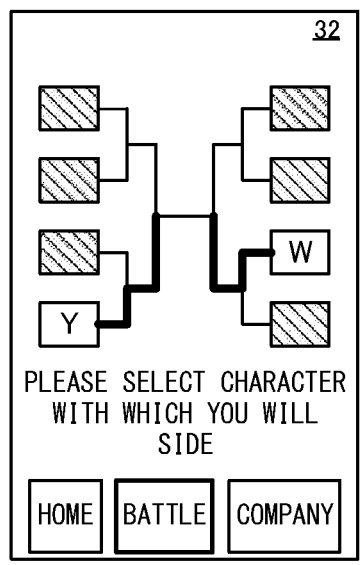
FIG. 11 is a diagram showing a non-limiting example of a screen for the user A after the user A participates in a camp X, and the camp X loses.

FIG. 11 is a diagram showing an example of a screen for the user A after the user A participates in the camp X, and the camp X loses. As shown in FIG. 11, when the own army X loses, a camp selection screen is displayed in accordance with the start of the next first competition game (the final). The user A can select any of the camps so long as the camp is a surviving camp. That is, when the camp Y wins the first competition game between the camp X and the camp Y, and the camp W wins the first competition game between the camp V and the camp W, the user A can participate in either one of the camp Y and the camp W.

Figure 12:
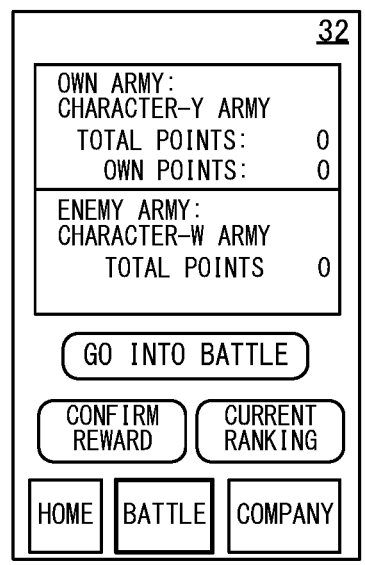
FIG. 12 is a diagram showing a non-limiting example of a screen for a user C after the user C participates in a camp Y, and the camp Y wins.

FIG. 12 is a diagram showing an example of a screen for the user C after the user C participates in the camp Y, and the camp Y wins. As shown in FIG. 12, when the own army Y wins, the camp selection screen ((a) of FIG. 6) is not displayed, and the go-into-battle screen ((c) of FIG. 6) is displayed. On the go-into-battle screen for the user C after the own army wins, the camp Y is displayed as an own army, and the camp W moving into the final is displayed as an enemy army. As shown in FIG. 12, points gained by both camps and points gained by the user C in the previous first competition game (i.e., the second-round match) are reset. That is, points gained in the previous first competition game are not carried on into the next first competition game.

Referring back to FIG. 10, when the current first competition game is the final (step S7: YES), this tournament event ends because the final ends. Here, when the tournament ends, points in all the games in the first competition game from the first-round match to the final are combined together, and in accordance with the combining result, a predetermined reward is given (step S9). For example, the grand total of points gained by the user in all the games in the first competition game from the first-round match to the final may be calculated, and rewards may be given in accordance with rankings regarding the grand total of points. For example, all the users are arranged in descending order of the grand total of points, and predetermined rewards corresponding to rankings (e.g., an item that can be used in a game, in-game virtual currency, a character, an image, a sound, or the like) are given to users at the first ranking to the thousandth ranking. The predetermined rewards to be given here may be of the same types as the predetermined rewards given in each game in the first competition game (S6), or may be rewards of different types. Further, rewards of the same types may be given, and the amounts of the rewards may be larger than those in each game in the first competition game.

As described above, in the exemplary embodiment, the first competition game in a tournament form is performed for a predetermined period. The first competition game is a game where users compete for the total of points according to the execution result of the second competition game of each user, and a large number of users participate in the game via a network. Points to be given when a user wins each game in the second competition game vary in accordance with the number of friends of the user. The larger the number of friends, the more points are given. Thus, it is possible to provide a user with a motivation to increase friends.

Further, in the exemplary embodiment, a character of another user (the own character 52) registered as a friend of a user and a character of another user (the own character 53) not registered as a friend of the user are used in the second competition game. Then, when the second competition game ends, it is possible to make a friend application for another user not registered as a friend. Thus, the user can increase friends by executing the second competition game. This provides a motivation to participate in the first competition game between camps. Further, the user makes a friend application based on the result of the second competition game. Thus, the user can view the ability of the own character 53 with which the user has fought in the second competition game, and can select a character (a user) having a high ability value and make a friend application for the character.

Further, in the second competition game, among other users registered as friends, a character of a user having a high ability value is likely to be selected. Thus, the larger the number of friends, the more advantageous to the user. Thus, it is possible to provide a user with a motivation to increase friends. That is, when a user has a large number of friends (has friend relationships with a large number of users), it is likely that the user has friends having high ability values. This provides a user a motivation to increase friends.

(Details of Game Processing)

Next, examples of processes performed by each smartphone 3 and the server 2 are specifically described.

Figure 13:
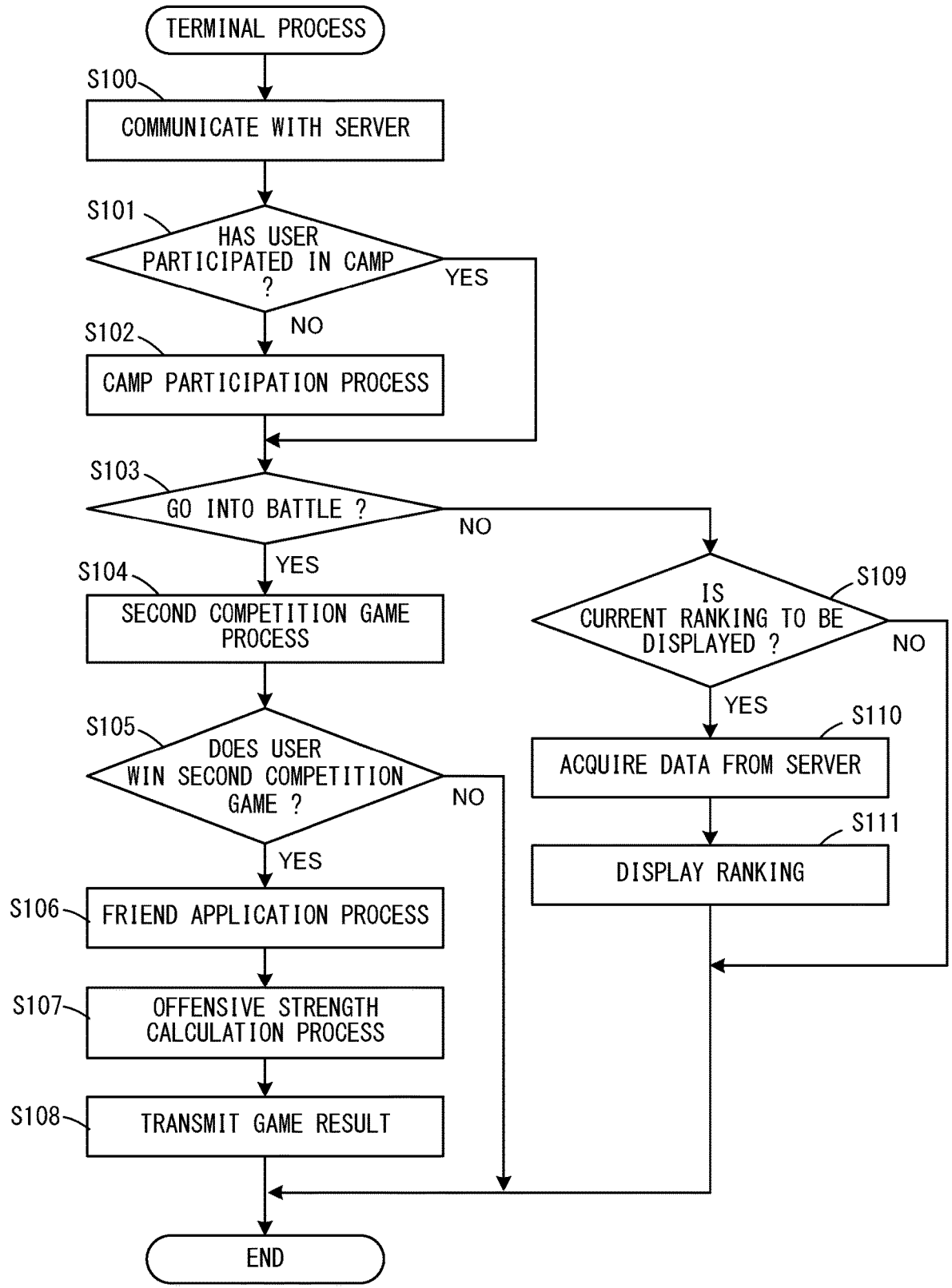
FIG. 13 is a flow chart showing a non-limiting example of a terminal process performed by the smartphone 3 (a terminal)

FIG. 13 is a flow chart showing an example of a terminal process performed by each smartphone 3 (a terminal). The process shown in FIG. 13 is performed by the processing section 31 of the smartphone 3 executing the game application program. Although the game application according to the exemplary embodiment can execute a game different from the above competition games, only a process according to the above competition games is shown in FIG. 13. It should be noted that the process shown in FIG. 13 is started by the user of the smartphone 3 giving an instruction to execute the game application. Further, the process shown in FIG. 13 is repeatedly executed at predetermined time intervals. Further, when the execution of the process shown in FIG. 13 is started, or at a predetermined timing during the execution, the smartphone 3 communicates with the server 2, and transmits and receives necessary data to and from the server 2.

As shown in FIG. 13, the smartphone 3 communicates with the server 2 (step S100). For example, the smartphone 3 receives information according to the first competition game (e.g., information indicating which round of a tournament is currently executed, information regarding surviving camps, information indicating whether or not the smartphone 3 participates in a camp, or the like) from the server 2.

After the process of step S100, the smartphone 3 determines whether or not the user has already participated in a camp (step S101). When the user has already participated in a camp (step S101: YES), the processing proceeds to step S103. When the user has not participated in a camp (step S101: NO), the smartphone 3 performs a camp participation process (step S102). In this camp participation process, images shown in (a) and (b) of FIG. 6 are displayed. When the user performs an operation for participating in a desired camp, the smartphone 3 transmits to the server 2 a participation request to participate in the camp specified by the user and registers the user (the smartphone 3) in the camp.

When the camp participation process in step S101 is performed, or when the user has already participated in a camp (step S101: YES), the smartphone 3 determines whether or not an instruction to go into battle is given (step S103). Here, the smartphone 3 determines whether or not the "go into battle" button is indicated on the go-into-battle screen in (c) of FIG. 6.

When an instruction to go into battle is given (step S103: YES), the smartphone 3 executes a second competition game process (step S104). Here, the second competition game screen in (d) of FIG. 6 is displayed.

It should be noted that the second competition game is not executed until the predetermined time (e.g., an hour) elapses from the execution of the previous second competition game. For example, the "go into battle" button may not be able to be operated on the go-into-battle screen until the predetermined time elapses from the execution of the previous second competition game. Alternatively, even if the button itself can be operated, but when the user operates the "go into battle" button, the second competition game may not be started.

When the second competition game ends in the second competition game process in step S104, the smartphone 3 determines whether or not the user wins the second competition game (step S105). When the user wins the second competition game (step S105: YES), the smartphone 3 performs a friend application process (step S106). Here, the friend application screen in (e) of FIG. 6 is displayed. Next, the smartphone 3 performs an offensive strength calculation process (step S107). Here, the offensive strength selection screen in (f) of FIG. 6 is displayed.

When the offensive strength calculation process is performed, the smartphone 3 transmits the result of the second competition game to the server 2 (step S108). Here, information indicating whether or not a friend application is made in step S106, and information regarding a partner of a friend application (a user name or the like of a partner with which a friend application is made) are transmitted to the server 2. Further, information indicating that an own army wins the second competition game, and information regarding the offensive strength (i.e., the number of points) calculated in step S107 are transmitted to the server 2. Further, in step S108, on the display section 32 of the smartphone 3, images corresponding to the number of friends are displayed. Specifically, on the result display screen shown in (g) of FIG. 6, a character corresponding to the user of the smartphone 3 and characters corresponding to the friends of the user are displayed. It should be noted that when the user loses the second competition game (step S105: NO), the smartphone 3 does not perform the processes of steps S106 to S108.

It should be noted that in the above description, only when the user wins the second competition game, the offensive strength (the number of points) is calculated in the smartphone 3, and information of the offensive strength is transmitted to the server 2. Alternatively, both when the user wins the second competition game and when the user loses the second competition game, the winning/losing result of the second competition game may be transmitted to the server 2. In this case, in accordance with the winning/losing result, the number of points may be calculated in the server 2.

On the other hand, when an instruction to go into battle is not given in step S103 (i.e., on the go-into-battle screen), the smartphone 3 determines whether or not the current ranking is to be displayed (step S109). Specifically, the smartphone 3 determines whether or not the "current ranking" button is indicated on the go-into-battle screen in (c) of FIG. 6. When it is determined that the current ranking is to be displayed (step S109: YES), the smartphone 3 accesses the server 2 and acquires information regarding the current ranking (step S110). Then, the smartphone 3 displays the current ranking (step S111). For example, in the smartphone 3, the current ranking of the user may be displayed in the form in which, as shown in FIG. 9, the numbers of points of a plurality of users are displayed in order from the first ranking, and the user name of the user using this smartphone 3 is displayed among the plurality of users. Further, the smartphone 3 may display the number of points and the current ranking of the user of this smartphone 3 in text without displaying other users. It should be noted that when the "confirm reward" button is operated on the go-into-battle screen in (c) of FIG. 6, a list of rewards gained by the user in the competition games may be displayed.

Next, an example of the process performed by the server 2 is specifically described.

Figure 14:
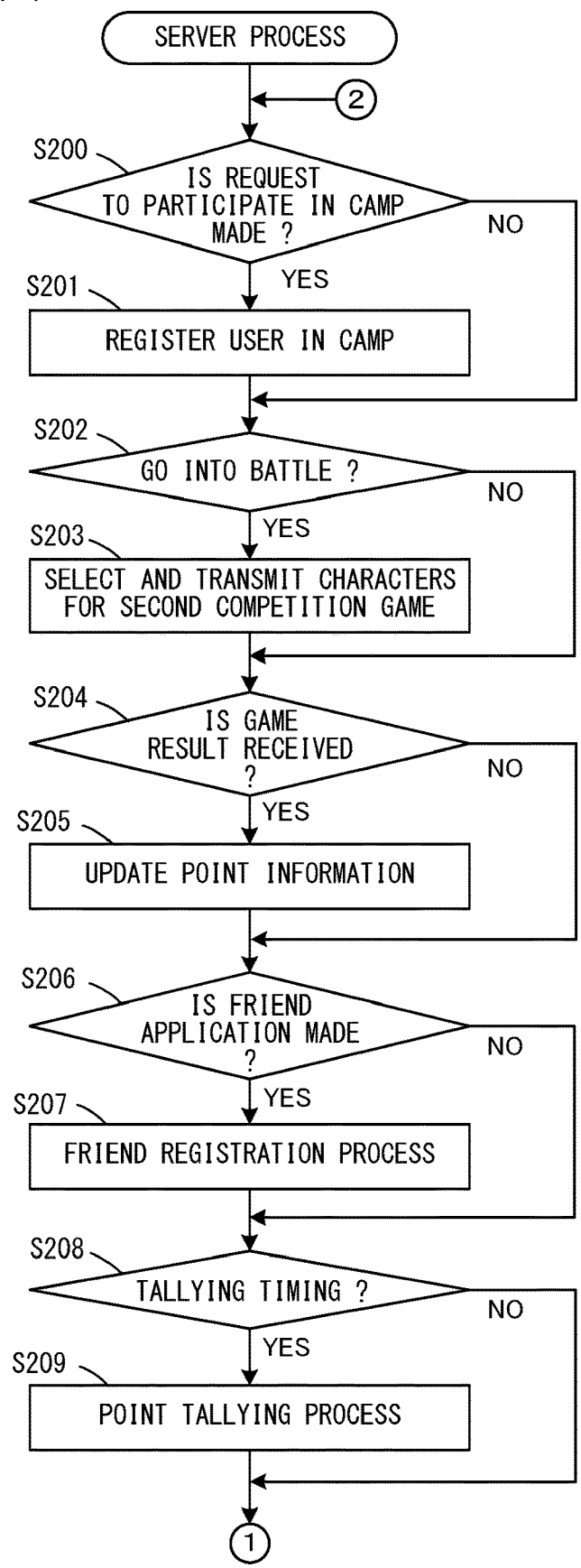
FIG. 14 is a flow chart showing a non-limiting example of a server process performed by the server 2.
Figure 15:
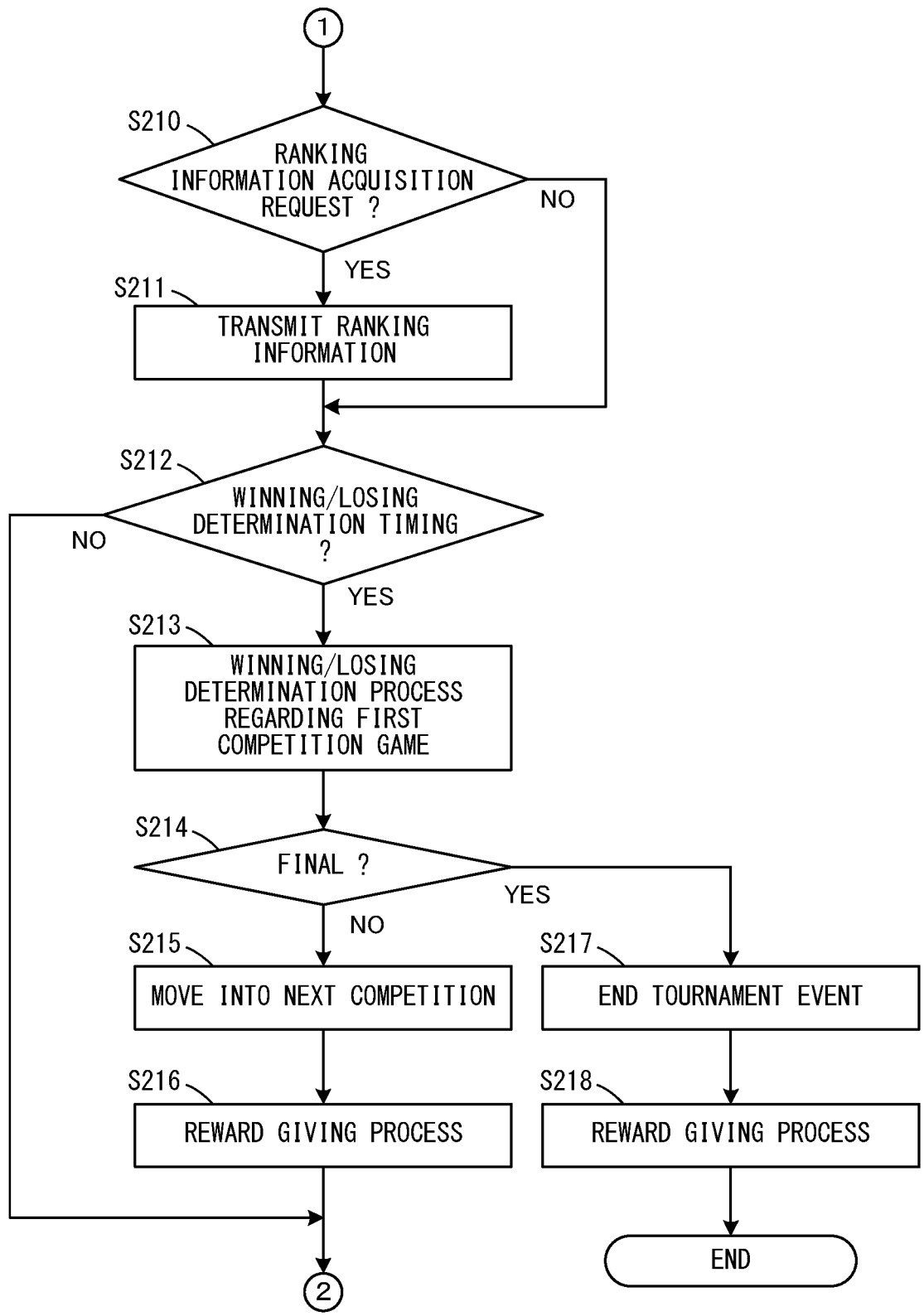
FIG. 15 is a flow chart showing the non-limiting example of the server process performed by the server 2.

FIGS. 14 and 15 are flow charts showing an example of a server process performed by the server 2. The process shown in FIGS. 14 and 15 is performed by the CPU of the server 2 executing a predetermined server program.

The server 2 determines whether or not the smartphone 3 makes a participation request to participate in a camp (step S200). Specifically, when a desired camp is selected by the user on the camp selection screen of the smartphone 3 ((a) of FIG. 6), and the "participate" button is operated on the confirmation screen ((b) of FIG. 6), the smartphone 3 transmits to the server 2 a participation request to participate in the selected camp. This participation request includes identification information of the user and information regarding the camp selected by the user.

When a participation request to participate in a camp is made (step S200: YES), the server 2 registers the user in the camp (step S201). Specifically, the server 2 stores information of the camp selected by the user in the camp information D4 shown in FIG. 5. For example, when the user E makes a participation request to participate in the camp Y, the server 2 stores "Y" in the camp information D4 corresponding to the user E in FIG. 5.

When step S201 is executed, or when the determination is NO in step S200, the server 2 determines whether or not information indicating that an instruction to go into battle is given (information indicating the start of the second competition game) is received from the smartphone 3 (step S202). When information indicating that an instruction to go into battle is given is received (step S202: YES), the server 2 selects characters for use in the second competition game and transmits the selection results to the smartphone 3 (step S203). Specifically, the server 2 selects as the own character 52 a character of another user who has a friend relationship with the user to execute the second competition game, and belongs to the same camp as the user. Further, the server 2 selects as the own character 53 a character of any of users who do not have friend relationships with the user to execute the second competition game, and belong to the same camp as the user. Then, the server 2 transmits the selection results of the characters to the smartphone 3. Further, the server 2 selects the enemy characters 61 to 63 and transmits the selection results to the smartphone 3.

When step S203 is executed, or when the determination is NO in step S202, the server 2 determines whether or not result information of the second competition game is received from the smartphone 3 (step S204). When result information of the second competition game is received (step S204: YES), the server 2 updates point information (step S205). The result information of the second competition game transmitted from the smartphone 3 includes gained point information indicating points gained by the user in the second competition game. When the server 2 receives the gained point information from the smartphone 3, the server 2 updates the value of the point information D5 in FIG. 5. Specifically, the server 2 adds the number of points according to the received gained point information to the current number of points of the user and saves the addition result as the point information D5. In this manner, points according to a predetermined game repeatedly performed are tallied for each user.

It should be noted that as described above, points according to the result of the second competition game may be calculated in the server 2. In this case, both when the user wins the second competition game and when the user loses the second competition game, each smartphone 3 transmits the result of the second competition game to the server 2. When it is determined in step S204 that result information of the second competition game is received, the server 2 calculates the number of points based on the received result information. Then, the server 2 updates the value of the point information D5 using the calculated number of points.

When step S205 is executed, or when the determination is NO in step S204, then based on the result information of the second competition game received from the smartphone 3, the server 2 determines whether or not the user makes a friend application (step S206). The result information of the second competition game includes, in addition to the point information, information indicating whether or not the user having executed the second competition game makes a friend application for another user, and information indicating a target user for the friend application. Based on the received result information of the second competition game, the server 2 determines whether or not the user makes a friend application. When it is determined that the user makes a friend application (step S206: YES), the server 2 performs a friend registration process (step S207). In the friend registration process in step S207, a process in which a certain user makes a friend application for another user, and a process in which a friend corresponding to the friend application is registered are performed. For example, when the user A makes a friend application for the user F, the server 2 stores, in a storage area corresponding to the user F, information indicating that the user A makes a friend application. Further, the server 2 may give a notification that the user A makes a friend application for the user F. This notification may be given, for example, by transmitting an electronic mail to the user F, or by, in accordance with the fact that the user F accesses the server 2 using the smartphone 3 of the user F, transmitting information indicating that the user A makes a friend application. Then, when the user F permits in the smartphone 3f the friend application made by the user A, the server 2 stores identification information of the user A in the friend information D3 corresponding to the user F and also stores identification information of the user F in the friend information D3 corresponding to the user A. Further, in the friend registration process in step S207, a process is also performed on a friend application executed by a method different from a friend application executed in the second competition game. For example, each user can make a friend application without performing the second competition game, using the smartphone 3 of the user themselves. This friend application is transmitted to the server 2, and the server 2 performs a process similar to the above process and registers a friend.

When step S207 is executed, or when the determination is NO in step S206, the server 2 determines whether or not the current time is the timing of tallying points (step S208). When it is determined that the current time is the timing of tallying points (step S208: YES), the server 2 performs a point tallying process (step S209). For example, the server 2 makes a determination "YES" in step S208 at predetermined time intervals (e.g., once an hour) In the subsequent step S209, the server 2 tallies points according to the second competition game performed in each smartphone 3. Specifically, the server 2 calculates the total numbers of points of all the camps currently performing the first competition game. For example, when the first competition game is currently performed between the camp X and the camp Y, the server 2 calculates the sum of the current numbers of points of all the users belonging to the camp X, thereby calculating the total number of points of the camp X. Further, the server 2 calculates the sum of the current numbers of points of all the users belonging to the camp Y, thereby calculating the total number of points of the camp Y.

When step S209 is executed, or when the determination is NO in step S208, then as shown in FIG. 15, the server 2 determines whether or not the smartphone 3 makes an acquisition request to acquire ranking information (step S210). Specifically, when the "current ranking" button is indicated on the go-into-battle screen in (c) of FIG. 6, the smartphone 3 transmits to the server 2 an acquisition request to acquire ranking information. When the server 2 receives the acquisition request to acquire ranking information (step S210: YES), the server 2 transmits to the smartphone 3 the current ranking of the user in a ranking form (step S211). Consequently, for example, an image as shown in FIG. 9 is displayed on the screen of the smartphone 3.

When step S211 is executed, or when the determination is NO in step S210, the server 2 determines whether or not the current time is the timing of a winning/losing determination regarding the first competition game (step S212). The timing of a winning/losing determination regarding the first competition game is a date and time determined in advance, and for example, is the timing when predetermined days elapse from the start of this competition game. When it is determined that the current time is the timing of a winning/losing determination regarding the first competition game (step S212: YES), the server 2 performs a winning/losing determination process regarding the first competition game (step S213). The server 2 determines winning or losing in each competition. For example, when a competition between the camp X and the camp Y is performed, and simultaneously, a competition between the camp V and the camp W is performed, the server 2 determines winning or losing regarding the competition between the camp X and the camp Y and also determines winning or losing regarding the competition between the camp V and the camp W. Specifically, the server 2 totals the points of all the users belonging to the camp X, thereby calculating the total number of points of the camp X, and also totals the point of all the users belonging to the camp Y, thereby calculating the total number of points of the camp Y. Then, the server 2 compares the total number of points of the camp X with the total number of points of the camp Y and determines winning or losing regarding the competition between the camp X and the camp Y. Further, the server 2 totals the points of all the users belonging to the camp V, thereby calculating the total number of points of the camp V, and also totals the points of all the users belonging to the camp W, thereby calculating the total number of points of the camp W. Then, the server 2 compares the total number of points of the camp V with the total number of points of the camp W and determines winning or losing regarding the competition between the camp V and the camp W.

Subsequent to step S213, the server 2 determines whether or not the current competition is a final (step S214). When the current competition is not the final (step S214: NO), the server 2 moves the camps having won the first competition game into a next competition (step S215). Then, the server 2 performs a reward giving process (step S216). Here, the reward giving process based on the result of the current competition is performed. For example, the server 2 gives predetermined rewards to all the users belonging to the camps having won the first competition game. Further, the server 2 gives predetermined rewards to users at high rankings regarding the number of points in each camp. As a method for giving rewards, for example, the server 2 may store predetermined information in a storage area corresponding to each user, thereby giving a reward to each user. For example, when virtual currency is given to each user, information of virtual currency of each user is rewritten, thereby increasing virtual currency. Further, for example, the server 2 may transmit predetermined data to each smartphone 3, thereby giving a reward. After the process of step S216, the processing proceeds to step S200.

On the other hand, when it is determined that the current competition is the final (step S214: YES), the server 2 ends the tournament event (step S217) and performs a reward giving process (step S218). In the reward giving process in step S218, in accordance with the results of all the games in the first competition game from the first-round match to the final in the current tournament event, a reward is given to each user. For example, the server 2 calculates the total of points of each user in the first-round match to the final and gives rewards to users at high rankings (e.g., the first ranking to the thousandth ranking). It should be noted that the reward giving process in step S216 may be performed before the reward giving process in step S218. That is, when the user wins the final, the reward giving process in step S216 corresponding to the winning in the final may be performed, and further, the reward giving process in step S218 corresponding to the results of all the games in the first competition game from the first-round match to the final in the current tournament event may be performed. When the process of step S218 ends, the server 2 ends the processing shown in FIGS. 14 and 15.

As described above, in the exemplary embodiment, each smartphone 3 and the server 2 communicate with each other, whereby a competition game is performed between a plurality of users.

It should be noted that the processes shown in the above flow charts are merely illustrative, and the order and the contents of the processes may be appropriately changed. Further, the values used in each process and determination may be changed.

(Variations)

While the exemplary embodiment has been described, another exemplary embodiment may be configured as follows.

For example, in the exemplary embodiment, users establish a friend relationship with each other. For example, when the user A and the user B establish a friend relationship with each other, identification information of the user B is stored in the friend information D3 corresponding to the user A, and identification information of the user A is stored in the friend information D3 corresponding to the user B. That is, in the exemplary embodiment, two users both store identification information of the partner, thereby building a two-way relationship. Then, in the exemplary embodiment, the number of points to be given when each user wins the second competition game varies in accordance with the number of two-way relationships (the number of friends).

In another exemplary embodiment, one user may store identification information of the other user, thereby building a one-way relationship. For example, the user B may declare "support" for the user A, thereby constructing a one-way relationship with the user A. In this case, for example, identification information of the user B is stored in a storage area corresponding to the user A (corresponding to the friend information D3 of the user A in FIG. 5). On the other hand, identification information of the user A is not stored in a storage area corresponding to the user B (the friend information D3 of the user B in FIG. 5). Then, the number of points to be given when the user A wins the second competition game may vary in accordance with the number of thus constructed one-way relationships (the number of other users for which the user A declares support). The configuration may be such that the larger the number of one-way relationships, the larger the number of points to be given.

Further, in the above exemplary embodiment, an asynchronous second competition game is performed in each smartphone 3. Specifically, the user of each smartphone 3 performs a second competition game where characters fight against enemy characters controlled by the processing section 31 of the smartphone 3. In another exemplary embodiment, in the second competition game, the user may perform a game where the user fights against another user on the Internet. That is, as the second competition game, a game where the user competes against another user connected to the Internet may be performed. Such a game where the user competes against another user may be an asynchronous game, or may be a synchronous game. For example, when a synchronous game is performed as the second competition game between two users, the two users simultaneously connect to the Internet, and an operation performed by one of the users is reflected on a screen for the other user in real time. Points may be given in accordance with the results of such a synchronous game performed by the users. Then, a large number of users may perform the synchronous game (the second competition game) and gain points. Then, points gained by the large number of users may be aggregated, and the above first competition game between camps may be performed. Further, when an asynchronous game is performed between two users, the two users do not necessarily need to simultaneously connect to the Internet. Points may be given in accordance with the results of such an asynchronous game performed by the users. Then, a large number of users may perform the asynchronous game and gain points. Then, points gained by the large number of users may be aggregated, and the above first competition game between camps may be performed.

Further, in the above exemplary embodiment, each smartphone 3 executes game processing according to the second competition game, whereby the second competition game is performed in the smartphone 3. In another exemplary embodiment, each smartphone 3 may receive an operation of the user and transmit operation information of the operation of the user to the server 2. Then, the server 2 may perform game processing based on the operation information, whereby the second competition game may be performed in the smartphone 3. Also in such a case, the process of receiving an operation regarding the second competition game and the process of performing display are performed in the smartphone 3, and the user executes the second competition game in the smartphone 3.

Further, part of the processing performed on the server 2 in each of the above processes may be performed in each smartphone 3. Alternatively, part of the processing performed on each smartphone 3 in each of the above processes may be performed in the server 2. For example, the friend information D3 shown in FIG. 5 may not be saved on the server 2, but may be saved on each smartphone 3. For example, when the user A makes a friend application for the user B in the smartphone 3a, the smartphone 3a stores, in the smartphone 3a itself, information indicating that the user A makes a friend application, and also transmits this information to the server 2. The server 2 transmits, to the smartphone 3b of the user B, information indicating that the user A makes a friend application for the user B. When the user B permits the friend application in the smartphone 3b, the smartphone 3b saves identification information of the user A in the smartphone 3b itself and also transmits the permission information to the server 2. When the server 2 transmits the permission information to the smartphone 3a, and the smartphone 3a receives the permission information, the smartphone 3a stores identification information of the user B in the smartphone 3a itself. In the state where identification information of a friend is thus registered in each smartphone 3, the smartphone 3 executes the second competition game. Then, as a result of executing the second competition game, the smartphone 3 calculates the number of points in accordance with the number of friends stored in the smartphone 3 itself and transmits the calculated number of points to the server 2. The server 2 tallies the number of points transmitted from each smartphone 3 and thereby can make a winning/losing determination between camps.

Further, the camp information D4 shown in FIG. 5 may not be saved on the server 2, but may be saved on each smartphone 3. Specifically, when in each smartphone 3, the user gives an instruction to participate in a camp, the smartphone 3 saves, in the smartphone 3 itself, information regarding the camp for which the instruction is given. Also in this case, when an own army wins the second competition game, each smartphone 3 calculates points to be given and transmits the points to the server 2. The server 2 tallies the number of points transmitted from each smartphone 3 and thereby can make a winning/losing determination between camps.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system for performing a first competition game, the game system comprising:
a plurality of information processing apparatuses operated by different respective users, each of the information processing apparatuses being configured to execute a predetermined game, wherein first user groups are formable for each user such that the respective user has a first type of association with each other user in its respective first user group; and
at least one processor configured to at least:
register each of the plurality of users in one of a plurality of second user groups;
assign points to each of the users according to the number of other user(s) in the respective user's first user group;
acquire points assigned to the users;
for each second user group, tally the acquired points; and
at a predetermined timing, make a winning/losing determination in the first competition game based on the points acquired and the points tallied with respect to each second user group.

2. The game system according to claim 1, wherein:
each information processing apparatus is configured to repeatedly execute the predetermined game, and
points are assigned based on the result of the predetermined game every time the predetermined game is executed by the information processing apparatuses.

3. The game system according to claim 1, wherein the larger the number of the other users in the first user groups, the more points are assigned.

4. The game system according to claim 1, wherein:
the information processing apparatuses are configured to perform, as the predetermined game, a second competition game based on an operation performed therein,
points are assigned based on a winning/losing result in the second competition game, and
the winning/losing determination in the first competition game is made based on the points.

5. The game system according to claim 1, wherein the at least one processor is further configured to at least further tally, for each user, points given based on the result of the predetermined game.

6. The game system according to claim 5, wherein the at least one processor is further configured to at least evaluate each user based on the further tallying.

7. The game system according to claim 1, wherein:
in the predetermined game, each information processing apparatus is configured to issue one or more requests to store identification information corresponding to one or more other users in association with identification information corresponding to the user of the respective information processing apparatus, and
the at least one processor is further configured to store the identification information corresponding to the other user(s) in association with the identification information corresponding to the user(s) that has/have issued the respective request(s).

8. The game system according to claim 7, wherein each information processing apparatus is configured to perform the predetermined game using a character of the user of another one of the information processing apparatuses and issue a request to store the identification information corresponding to the user of the character used in the predetermined game in association with the identification information.

9. The game system according to claim 8, wherein each information processing apparatus is configured to issue the request to store the identification information corresponding to another user in association with the identification information, provided that the identification information corresponding to the another user is not stored in association with the identification information.

10. A game system for performing a first competition game among a plurality of users by using a plurality of information processing apparatuses corresponding to the plurality of users and a server,
each of the plurality of information processing apparatuses being configured to execute a predetermined game,
the game system being configured to at least:
store, in a data store, identification information corresponding to one of the plurality of users in association with at least one of pieces of identification information corresponding to another one of the plurality of users different from the one of the plurality of users; and
based on a result of the predetermined game executed by the information processing apparatus, give points according to the number of the pieces of identification information corresponding to other users among the plurality of users stored in association with identification information corresponding to the user of the information processing apparatus,
the server being configured to at least:
acquire points given based on the result of the predetermined game executed in each of the plurality of information processing apparatuses; and
at a predetermined timing, make a winning/losing determination in the first competition game based on the points acquired in the acquisition process, wherein:
the game system being further configured to at least:
register each of the plurality of users in any of a plurality of groups; and
select a predetermined number of characters of other users from the same group as a group in which the user is registered, including selection of a first character of a first user corresponding to first identification information stored in association with the identification information in the storage section and a second character of a second user corresponding to second identification information not stored in association with the identification information in the storage section, and
the information processing apparatuses being configured to perform the predetermined game using at least the first selected character and the second selected character.

11. The game system according to claim 10, wherein the game system is further configured to:
store the plurality of pieces of identification information corresponding to other users in association with the identification information; and
select as the first character a character of another one of the plurality of users that is advantageous in the predetermined game from among characters of other users corresponding to the plurality of pieces of identification information corresponding to other users.

12. The game system according to claim 1, wherein the predetermined timing corresponds to a predetermined amount of time elapsing, or the predetermined game having been performed a predetermined number of times.

13. The game system according to claim 1, wherein points are assignable using a predetermined item, and more points are given when the predetermined item is used compared to when the predetermined item is not used.

14. The game system according to claim 13, wherein the at least one processor is further configured to at least allow the user of a given information processing apparatus to set the number of predetermined items to be used,
wherein points are assignable in accordance with the number of predetermined items to be used set by the user of the given information processing apparatus.

15. The game system according to claim 14, wherein the larger the number of predetermined items to be used, the more points assigned.

16. The game system according to claim 13, wherein the predetermined item is an item acquired by the user of the given information processing apparatus charging.

17. The game system according to claim 1, wherein the information processing apparatuses are configured to vary a representation form in the predetermined game in accordance with the number of other users in their respective first user groups.

18. The game system according to claim 1, wherein the information processing apparatuses are configured to perform representations in the predetermined game using other users' characters.

19. The game system according to claim 1, wherein the at least one processor is further configured to store identification information corresponding to a first user in association with identification information corresponding to a second user, in accordance with an operation of the first or second user.

20. The game system according to claim 1, wherein the at least one processor is further configured to store identification information corresponding to a first user in association with identification information corresponding to a second user, in accordance with operations of the first and second users.

21. A game control method for performing a first competition game in connection with a game system including a plurality of information processing apparatuses operated by different respective users, each of the information processing apparatuses being configured to execute a predetermined game, wherein first user groups are formable for each user such that the respective user has a first type of association with each other user in its respective first user group, the method comprising:
registering each of the plurality of users in one of a plurality of second user groups;
assigning points to each of the users according to the number of other user(s) in the respective user's first user group;
acquiring points assigned to the users;
for each second user group, tallying the acquired points; and
at a predetermined timing, making a winning/losing determination in the first competition game based on the points acquired and the points tallied with respect to each second user group.

22. A server for communicating with a plurality of information processing apparatuses operated by different respective users in connection with a competition game performed between the plurality of users, each of the plurality of information processing apparatuses being configured to execute a predetermined game, wherein first user groups are formable for each user such that the respective user has a first type of association with each other user in its respective first user group, the server comprising at least one processor being configured to at least:
register each of the plurality of users in one of a plurality of second user groups;
acquire points that have been assigned to the users in accordance with the number of other user(s) in the respective user's first user group;
for each second user group, tally the acquired points; and
at a predetermined timing, make a winning/losing determination in the competition game based on the points acquired and the points tallied with respect to each second user group.

23. A non-transitory storage medium having stored therein a program executed by a computer of a server for communicating with a plurality of information processing apparatuses operated by different respective users in connection with a competition game performed between the plurality of users, each of the plurality of information processing apparatuses being configured to execute a predetermined game, wherein first user groups are formable for each user such that the respective user has a first type of association with each other user in its respective first user group, the program causing the computer to at least:
register each of the plurality of users in one of a plurality of second user groups;
acquire points that have been assigned to the users in accordance with the number of other user(s) in the respective user's first user group;
for each second user group, tally the acquired points; and
at a predetermined timing, make a winning/losing determination in the competition game based on the points acquired and the points tallied with respect to each second user group.

24. The game system according to claim 1, wherein
the second user groups are formable such that each user in each second user group has a second type of association with each other user in the respective second user group, the first and second types of association being different from one another.

25. The game system according to claim 24, wherein the first competition game is performed between at least two different second user groups.

26. The game system according to claim 24, wherein the first type of association is a friend association, and the second type of association is a team-related association.

* * * * *